(12) United States Patent
Youn et al.

(10) Patent No.: US 9,931,977 B2
(45) Date of Patent: Apr. 3, 2018

(54) VEHICLE LAMP

(71) Applicant: SL Corporation, Daegu (KR)

(72) Inventors: Sung Wook Youn, Gyeonsangbu-do (KR); Hye Jin Han, Gyeongsanbu-do (KR); Jin Hee Yu, Gyeongsanbu-do (KR)

(73) Assignee: SL Corporation, Daegu (KR)

( * ) Notice: Subject to any disclaimer, the term of this patent is extended or adjusted under 35 U.S.C. 154(b) by 0 days.

(21) Appl. No.: 15/360,453

(22) Filed: Nov. 23, 2016

(65) Prior Publication Data

US 2017/0151904 A1    Jun. 1, 2017

(30) Foreign Application Priority Data

Nov. 27, 2015  (KR) .......................... 10-2015-0167521
Nov. 27, 2015  (KR) .......................... 10-2015-0167527

(51) Int. Cl.
*B60Q 1/26*    (2006.01)
*B60Q 1/34*    (2006.01)
(Continued)

(52) U.S. Cl.
CPC .............. *B60Q 1/346* (2013.01); *B60Q 1/22* (2013.01); *B60Q 1/2607* (2013.01); *B60Q 1/34* (2013.01);
(Continued)

(58) Field of Classification Search
CPC .. F21S 48/234; F21S 48/1358; F21S 48/1364; B60Q 1/2607
See application file for complete search history.

(56) References Cited

U.S. PATENT DOCUMENTS 8,794,789 B2 *  8/2014  Yu ........................ B60Q 1/2611
                                                 362/236
9,200,775 B2 * 12/2015  Eckhardt ............... F21S 48/215
(Continued)

FOREIGN PATENT DOCUMENTS

DE   10 2013 217 284 A1   9/2014
EP        2 426 406 A2    3/2012
(Continued)

OTHER PUBLICATIONS

European Search Report dated Apr. 3, 2017 in corresponding EP Application No. 16200805.6.

*Primary Examiner* — Douglas W Owens
*Assistant Examiner* — Pedro C Fernandez
(74) *Attorney, Agent, or Firm* — Mintz Levin Cohn Ferris Globsky and Popeo, P.C.; Kongsik Kim; Colleen H. Witherell

(57) ABSTRACT

A vehicle lamp which enables vehicles or pedestrians around a vehicle to easily recognize a driving direction of the vehicle is provided. The vehicle lamp includes a driving direction sensing unit configured to sense a driving direction of a vehicle, a driving direction indicating unit configured to form a first pattern indicating the driving direction and forms a second pattern indicating the driving direction on a road surface around the vehicle and a control unit configured to adjust the driving direction indicating unit based on to the sensed driving direction. The driving direction indicating unit includes at least one lamp unit. The lamp unit includes a light source and a reflection unit having a plurality of reflectors which form the first pattern and the second pattern, respectively.

17 Claims, 30 Drawing Sheets

(51) Int. Cl.
  *H05B 37/02* (2006.01)
  *B60Q 1/22* (2006.01)
  *B60Q 1/50* (2006.01)
  *B60Q 1/18* (2006.01)

(52) U.S. Cl.
  CPC .............. *B60Q 1/50* (2013.01); *F21S 41/147* (2018.01); *F21S 41/33* (2018.01); *F21S 41/334* (2018.01); *F21S 41/336* (2018.01); *F21S 41/36* (2018.01); *F21S 41/365* (2018.01); *F21S 43/14* (2018.01); *F21S 43/31* (2018.01); *H05B 37/0227* (2013.01); *B60Q 1/18* (2013.01); *B60Q 2400/50* (2013.01)

(56) References Cited

U.S. PATENT DOCUMENTS

| | | | |
|---|---|---|---|
| 2012/0075875 A1* | 3/2012 | Son | B60Q 1/50 362/487 |
| 2014/0328071 A1* | 11/2014 | Son | B60Q 1/346 362/464 |
| 2016/0257243 A1 | 9/2016 | Son et al. | |

FOREIGN PATENT DOCUMENTS

| | | |
|---|---|---|
| EP | 2 543 542 A1 | 1/2013 |
| EP | 3 118 515 A1 | 1/2017 |
| JP | 2000-294014 A | 10/2000 |
| JP | 2009-255737 A | 11/2009 |
| KR | 10-2014-0079153 | 6/2014 |
| WO | 2015/133302 A1 | 9/2015 |

* cited by examiner

1

VEHICLE LAMP

CROSS-REFERENCE TO RELATED APPLICATIONS

This application claims priority to Korean Application No. 10-2015-0167521 filed on Nov. 27, 2015 and Korean Application No. 10-2015-0167527 filed on Nov. 27, 2015. The applications are incorporated herein by reference.

BACKGROUND

1. Field of Disclosure

The present disclosure relates to a vehicle lamp, and more particularly, to a vehicle lamp which enables vehicles or pedestrians around a vehicle to more easily recognize a driving direction of the vehicle.

2. Description of the Related Art

Generally, a vehicle includes various types of lamps having a lighting function and a signaling function. The lighting function enables the driver of the vehicle to detect objects around the vehicle while driving during low light conditions (e.g., at night). The signaling function is used to inform other vehicles and road users of the vehicle's driving state. For example, a headlamp and a fog lamp are designed to provide for the lighting function, and a turn signal lamp, a backup lamp and a brake lamp are designed to provide for the signaling function. In particular, the turn signal lamp is installed on the front and back of a vehicle to inform vehicles or pedestrians around the vehicle of the turning direction of the vehicle by flickering when the driving direction of the vehicle changes, for example, when the vehicle turns left or right at the crossroads or changes lanes. Additionally, when the vehicle reverses, the backup lamp is turned on to inform vehicles or pedestrians around the vehicle of the reversing of the vehicle.

In other words, even when the turn signal lamp flickers to indicate the turning direction of the vehicle, it may be difficult for vehicles or pedestrians around the vehicle to recognize the turning direction of the vehicle based on their locations. In addition, even when the backup lamp is turned on to indicate the reversing of the vehicle, it may be difficult for vehicles or pedestrians located on the sides of the vehicle to recognize the reversing of the vehicle. Therefore, there is a need for a solution that enables vehicles or pedestrians around a vehicle to recognize the driving direction of the vehicle even in a situation where it is difficult to notice the flickering of a turn signal lamp or the lighting of a backup lamp.

The above information disclosed in this section is intended merely to aid in the understanding of the background of the invention, and therefore may contain information that does not form the prior art that is already known to a person of ordinary skill in the art.

SUMMARY

The present disclosure provides a vehicle lamp which enables vehicles or pedestrians around a vehicle to more easily recognize a driving direction of the vehicle by forming a pattern indicating the driving direction of the vehicle on a road surface around the vehicle. However, aspects of the inventive concept are not restricted to the one set forth herein.

According to an aspect of the exemplary embodiment, a vehicle lamp may include a driving direction sensing unit configured to sense a driving direction of a vehicle, a driving direction indicating unit configured to form a first pattern indicating the driving direction and forms a second pattern indicating the driving direction on a road surface around the vehicle and a control unit configured to adjust the driving direction indicating unit based on the sensed driving direction. The driving direction indicating unit may include at least one lamp unit. The one lamp unit may include a light source and a reflection unit including a plurality of reflectors which form the first pattern and the second pattern, respectively.

According to another aspect of the exemplary embodiment, a vehicle lamp may include a driving direction sensing unit configured to sense a driving direction of a vehicle, a driving direction indicating unit configured to form a first pattern indicating the driving direction of the vehicle and forms a second pattern indicating the driving direction of the vehicle on a road surface around the vehicle and a control unit configured to adjust the driving direction indicating unit based on the sensed driving direction. The driving direction indicating unit may include a first lamp assembly which forms the first pattern and a second lamp assembly which forms the second pattern. The second lamp assembly may include a light source and a reflection unit which forms the second pattern by reflecting light emitted from the light source.

BRIEF DESCRIPTION OF THE DRAWINGS

These and/or other aspects will become apparent and more readily appreciated from the following description of the exemplary embodiments, taken in conjunction with the accompanying drawings in which.

DETAILED DESCRIPTION

Figure 1:
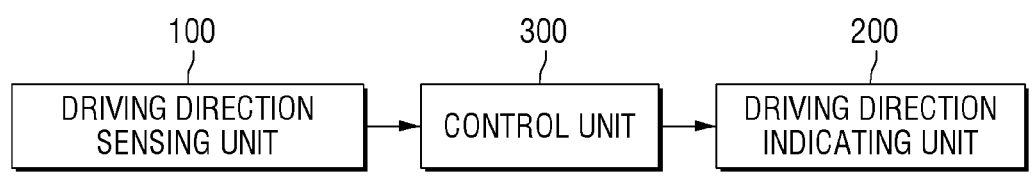
FIG. 1 is an exemplary block diagram of a vehicle lamp according to an exemplary embodiment of the present disclosure.

Advantages and features of the inventive concept and methods of accomplishing the same may be understood more readily by reference to the following detailed description of exemplary embodiments and the accompanying drawings. The inventive concept may, however, be embodied in many different forms and should not be construed as being limited to the embodiments set forth herein. Rather, these embodiments are provided so that this disclosure will be thorough and complete and will fully convey the concept of the disclosure to those skilled in the art, and the inventive concept will only be defined by the appended claims. Like reference numerals refer to like components throughout the specification.

In some embodiments, well-known processing processes, well-known structures and well-known technologies will not be specifically described in order to avoid ambiguous interpretation of the inventive concept.

The terminology used herein is for the purpose of describing particular embodiments only and is not intended to be limiting of the inventive concept. As used herein, the singular forms "a", "an" and "the" are intended to include the plural forms as well, unless the context clearly indicates otherwise. It will be further understood that the terms "comprises" and/or "comprising," when used in this specification, specify the presence of stated components, steps, and/or operations, but do not preclude the presence or addition of one or more other components, steps, operations, and/or groups thereof. As used herein, the term "and/or" includes any and all combinations of one or more of the associated listed items.

Embodiments of the inventive concept are described herein with reference to perspective, cross-sectional, side and/or schematic illustrations that are illustrations of idealized embodiments of the inventive concept. As such, variations from the shapes of the illustrations as a result, for example, of manufacturing techniques and/or tolerances, are to be expected. Thus, embodiments of the inventive concept should not be construed as limited to the particular shapes of regions illustrated herein but are to include deviations in shapes that result, for example, from manufacturing. In addition, each component shown in figures of the inventive concept may have been enlarged or reduced for ease of description.

Although an exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium may also be distributed in network coupled computer systems so that the computer readable media is stored and executed in a distributed fashion, e.g., by a telematics server or a Controller Area Network (CAN).

It is understood that the term "vehicle" or "vehicular" or other similar term as used herein is inclusive of motor vehicle in general such as passenger automobiles including sports utility vehicles (SUV), buses, trucks, various commercial vehicles, watercraft including a variety of boats, ships, aircraft, and the like and includes hybrid vehicles, electric vehicles, combustion, plug-in hybrid electric vehicles, hydrogen-powered vehicles and other alternative fuel vehicles (e.g. fuels derived from resources other than petroleum).

Hereinafter, vehicle lamps according to embodiments of the inventive concept will be described with reference to the attached drawings.

FIG. 1 is an exemplary block diagram of a vehicle lamp 1 according to an exemplary embodiment. Referring to FIG. 1, the vehicle lamp 1 according to the exemplary embodiment may include a driving direction sensing unit 100, a driving direction indicating unit 200, and a control unit 300. In the exemplary embodiment, a case where the vehicle lamp 1 is used as a turn signal lamp for indicating a turning direction of a vehicle or a backup lamp for indicating reversing of the vehicle will be described. However, the vehicle lamp 1 of the inventive concept may also be used as various lamps installed in the vehicle. The driving direction sensing unit 100 may be configured to sense a driving direction of the vehicle that may include the turning direction of the vehicle or the reversing of the vehicle. In the exemplary embodiment, the driving direction sensing unit 100 may be configured to sense a reverse driving (e.g., a gear and the turning direction of the vehicle through an angle of rotation of a handle or wheels, a driver's manipulation, a lane sensed, etc). The driving direction sensing unit 100 may include various sensors that may be configured to sense the driving direction of the vehicle.

Figure 2:
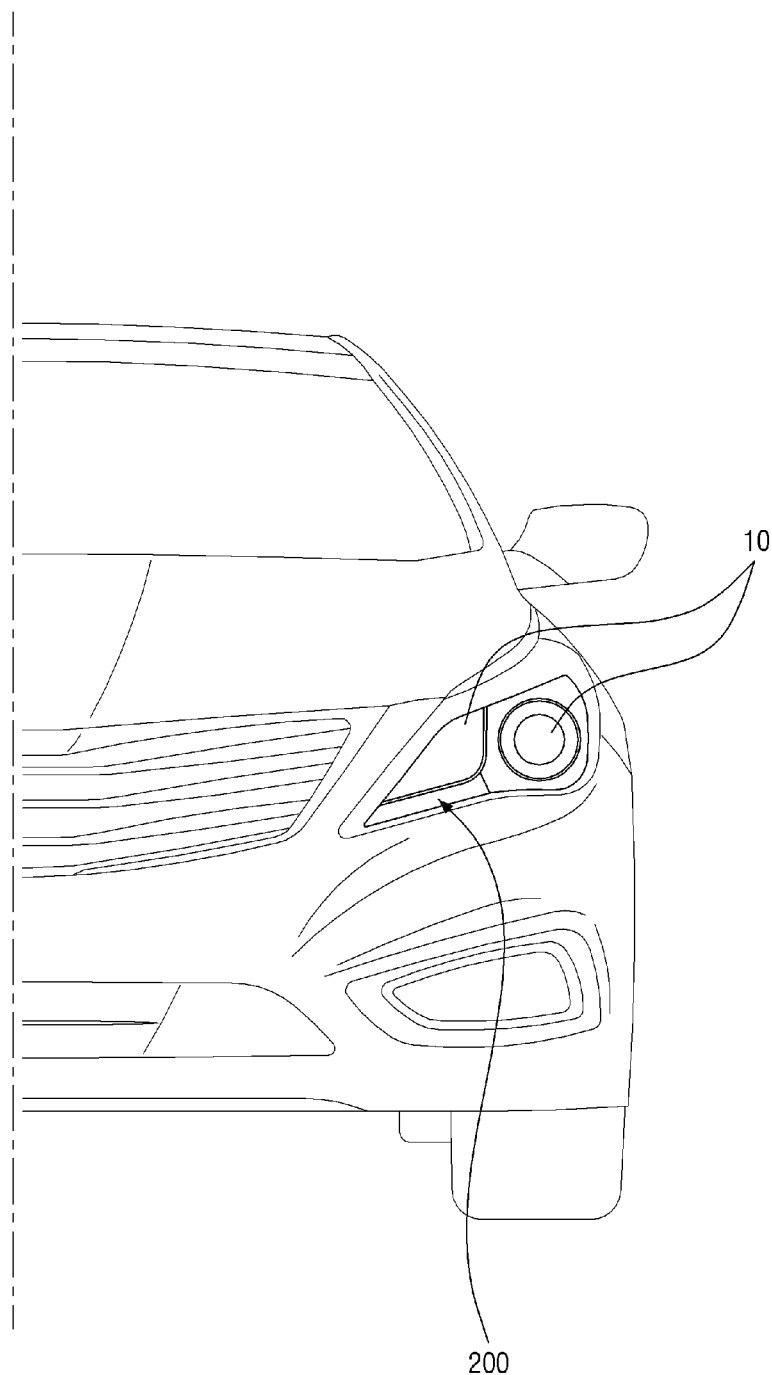
FIGS. 2 through 4 are exemplary schematic diagrams of a vehicle equipped with vehicle lamps according to an exemplary embodiment of the present disclosure.
Figure 3:
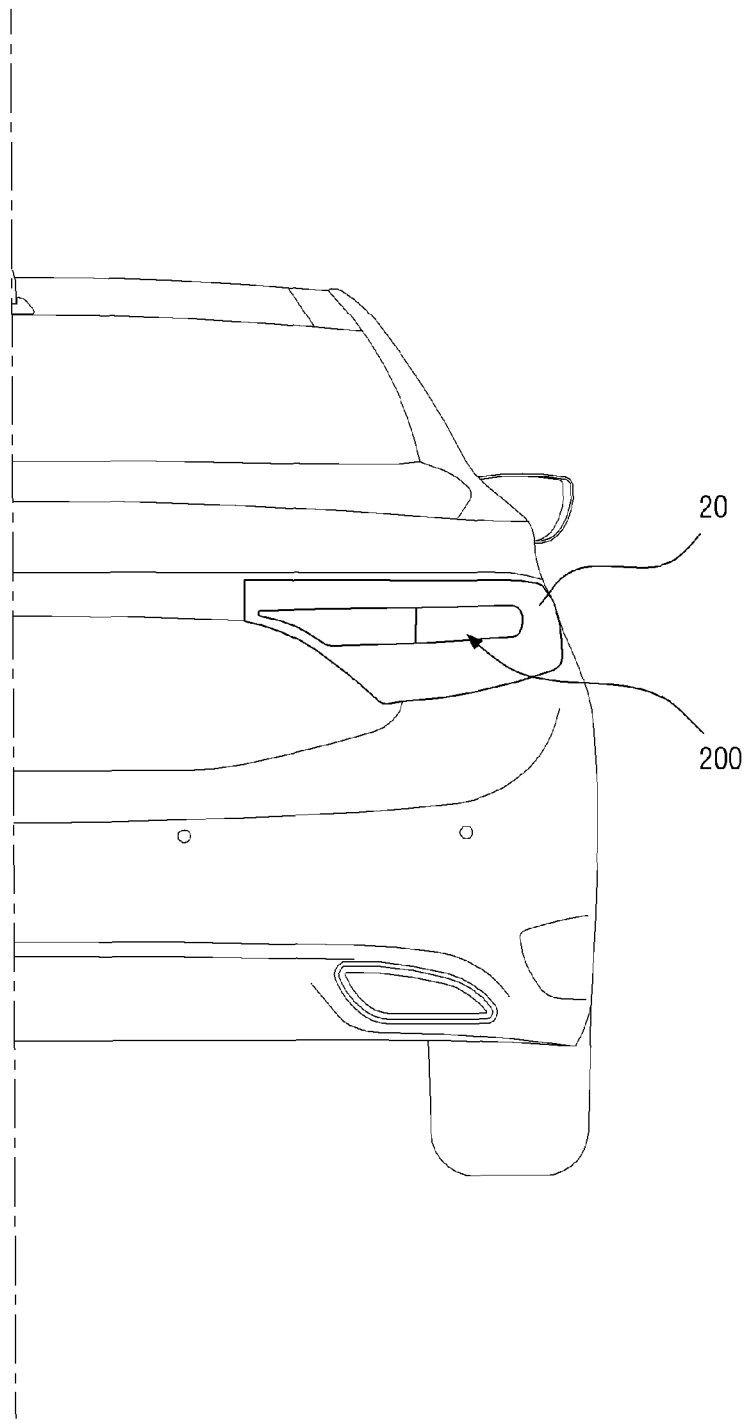
Figure 4:
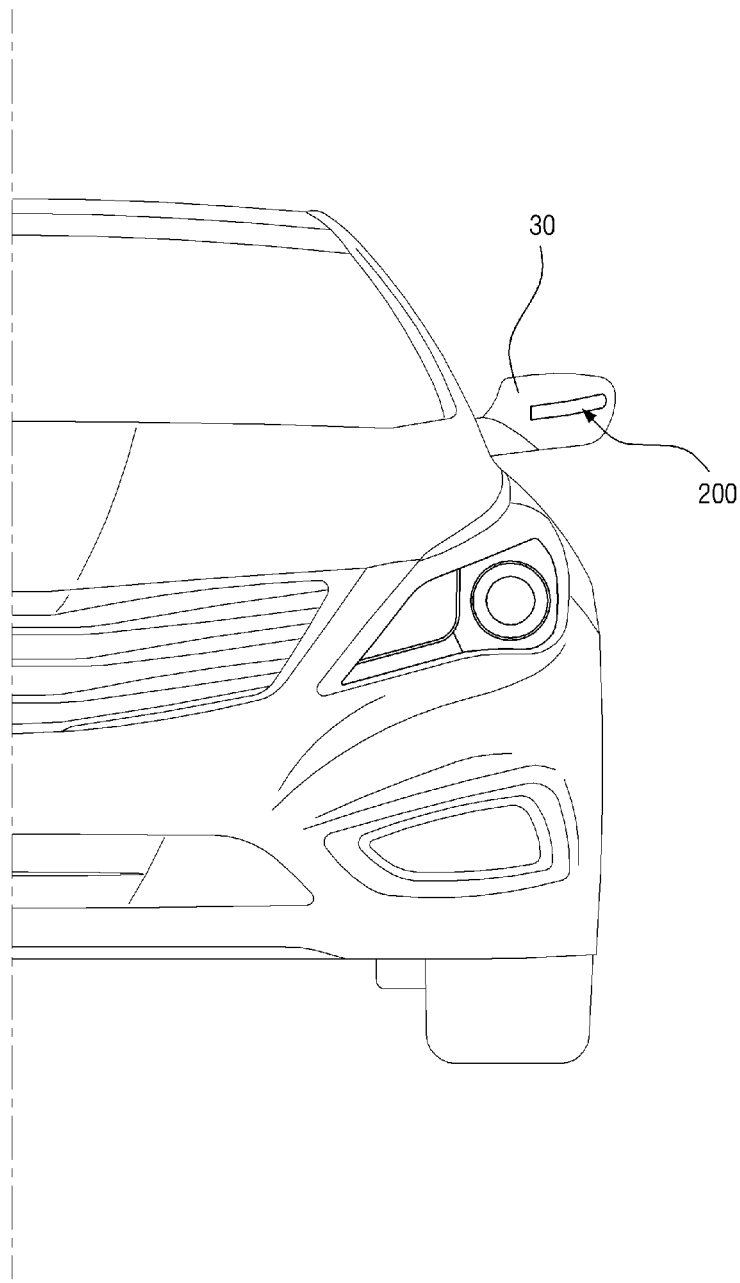

The driving direction indicating unit 200 may be installed on at least one side of the front or back of the vehicle to indicate the driving direction of the vehicle. For example, the driving direction indicating unit 200 may be installed proximate to a headlamp 10 on the front of the vehicle as illustrated in FIG. 2, proximate to a tail lamp 20 of the vehicle as illustrated in FIG. 3, or proximate to an outside mirror 30 of the vehicle as illustrated in FIG. 4. However, this is merely an example used to help understand the inventive concept, and the driving direction indicating unit 200 may also be installed at various locations at that may indicate the driving direction of the vehicle.

In the exemplary embodiment, when the driving direction indicating unit 200 is installed on both sides of each of the front and back of the vehicle to indicate the turning direction or reversing of the vehicle will be described. At least one of the driving direction indicating units 200 respectively installed on both sides of each of the front and back of the vehicle may be configured to operate based on the driving direction of the vehicle. In addition, driving direction indicating units 200 may be installed to respectively indicate the turning direction and reversing of the vehicle, or driving direction indicating unit 200 may be used to indicate any one of the turning direction and reversing of the vehicle according to the driving direction of the vehicle.

For example, the driving direction indicating unit 200 may form a first pattern P1 and a second pattern P2 that may indicate the turning direction of the vehicle as illustrated in FIGS. 5 through 8. In the exemplary embodiment, a case where the first pattern P1 is a lighting pattern or a flickering pattern and the second pattern P2 is a road surface pattern formed on a road surface around the vehicle at a predetermined angle to a centerline of the vehicle will be described. Like the first pattern P1, the second pattern P2 may remain illuminated or may be incrementally light (e.g., flicker).

Figure 5:
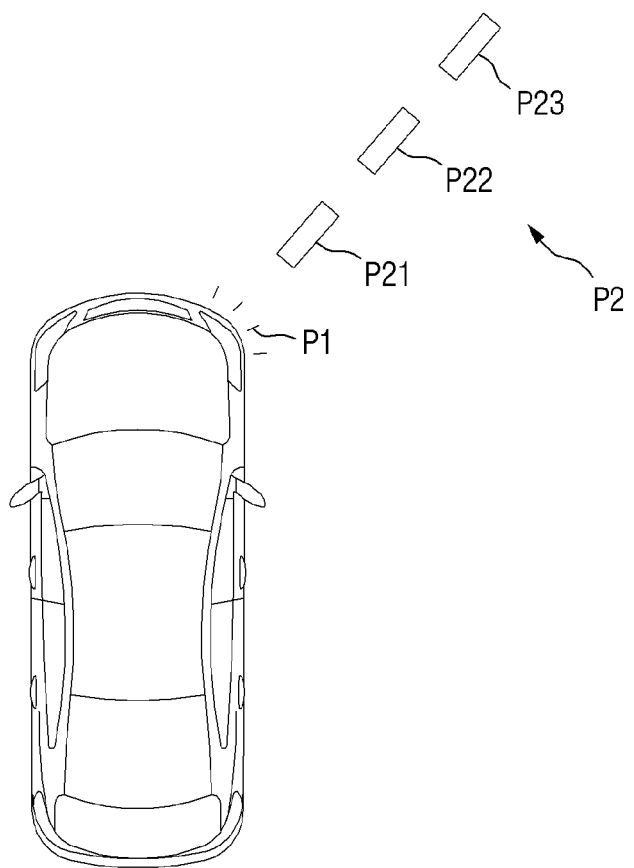
FIGS. 5 through 8 are exemplary schematic diagrams of a first pattern and a second pattern indicating a turning direction of a vehicle according to exemplary embodiments of the present disclosure.
Figure 6:
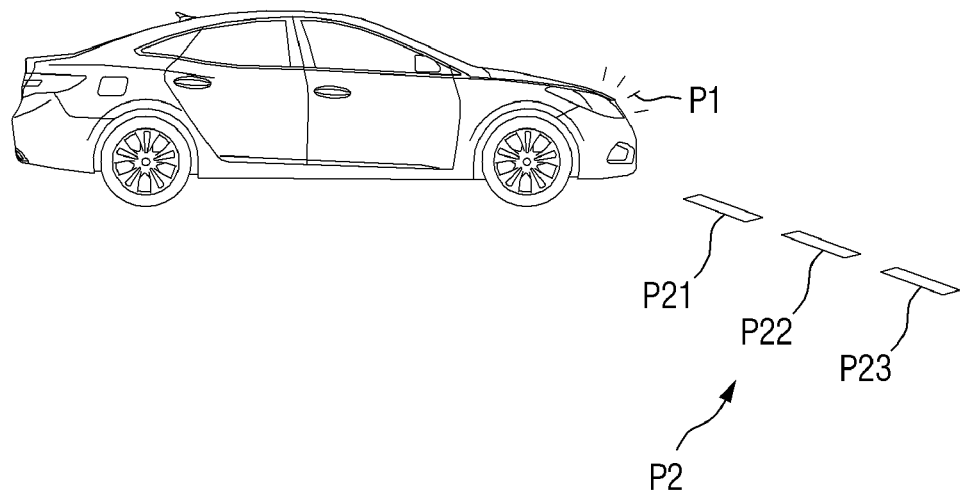
Figure 7:
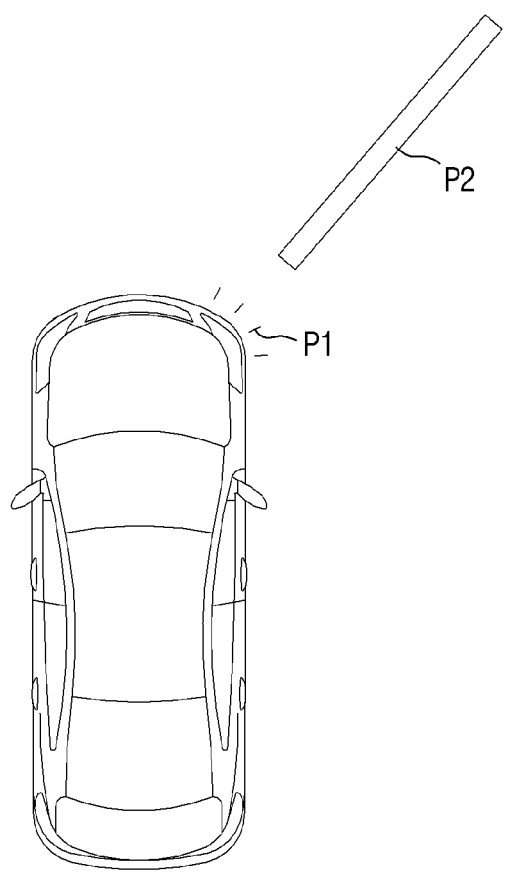
Figure 8:
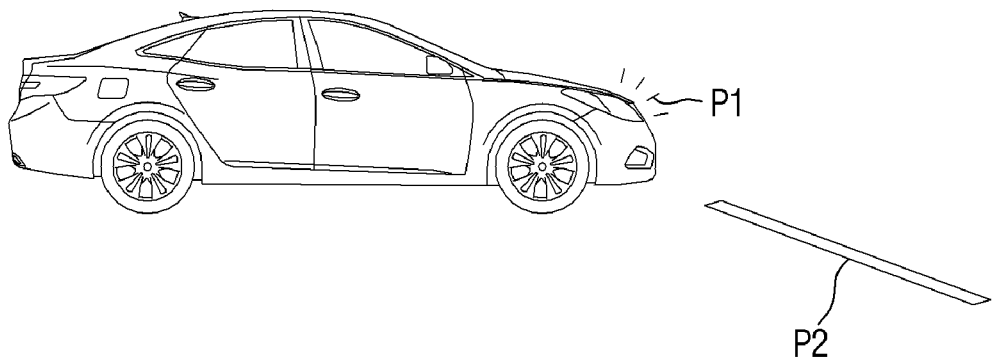
Figure 9:
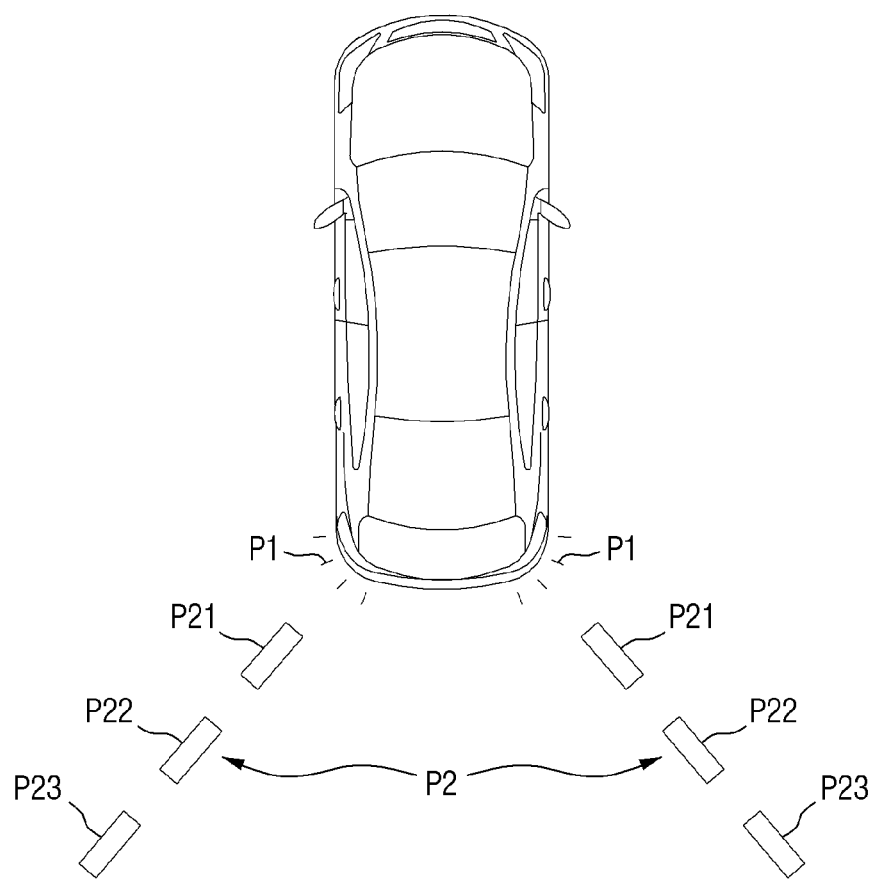
FIGS. 9 through 12 are exemplary schematic diagrams of a first pattern and a second pattern indicating reversing of a vehicle according to exemplary embodiments of the present disclosure.
Figure 10:
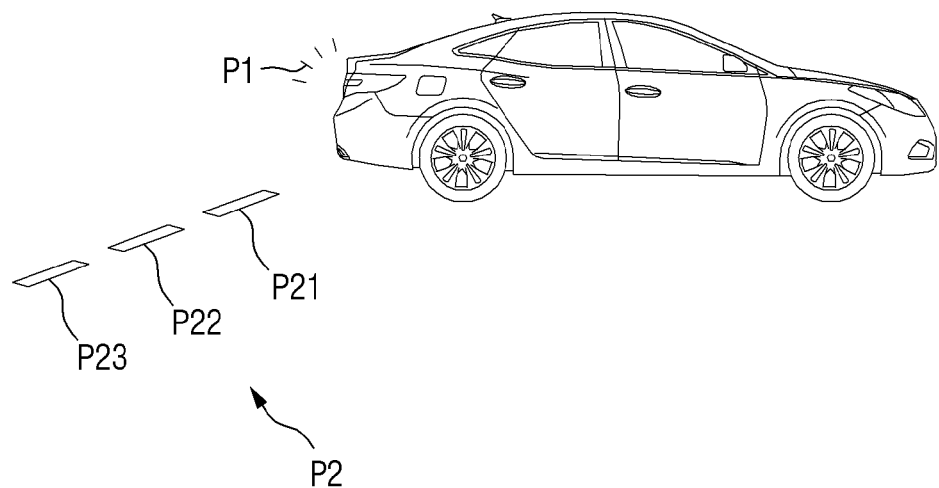
Figure 11:
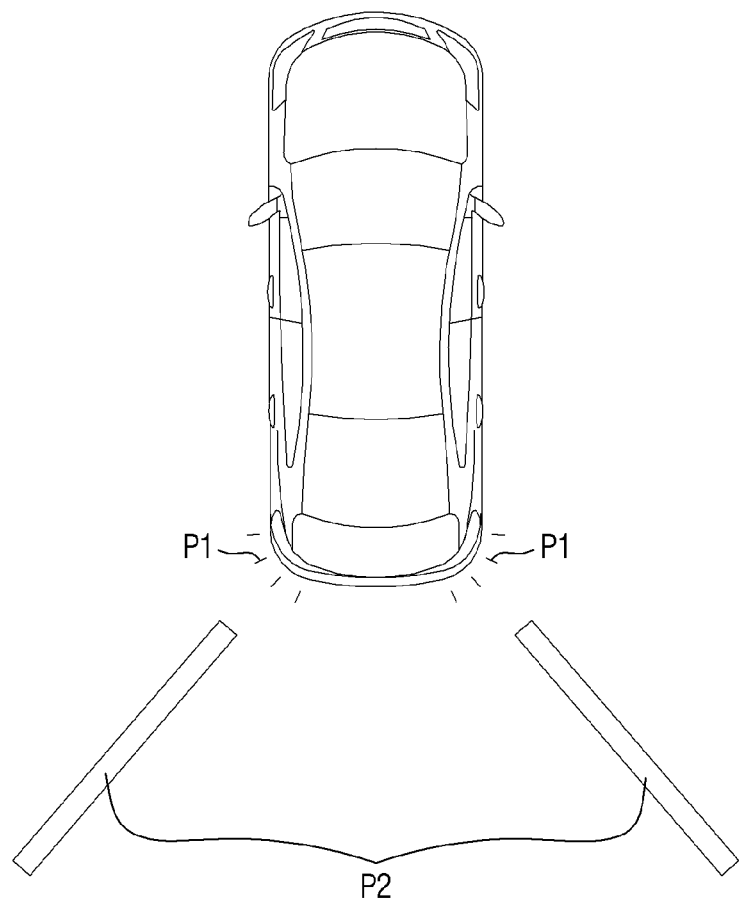
Figure 12:
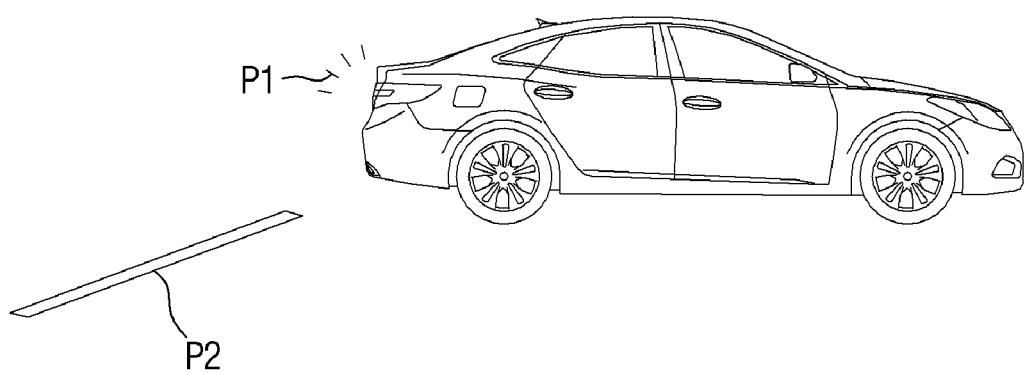

FIGS. 5 and 6 illustrate an example of a case where the second pattern P2 may include a plurality of pattern areas P21 through P23. FIGS. 7 and 8 illustrate an example of a case where the second pattern P2 may include a single pattern area. In FIGS. 5 through 8, a case where the driving direction indicating unit 200 installed on a side of the front of the vehicle is operated is described as an example. However, the inventive concept is not limited to this case, and the driving direction indicating units 200 respectively installed on a side of the front of the vehicle and on a side of the back of the vehicle may also be operated together to indicate the turning direction of the vehicle.

The driving direction indicating unit 200 may form a first pattern P1 and a second pattern P2 which indicate the reversing of the vehicle as illustrated in FIGS. 9 through 12. When the driving direction indicating unit 200 indicates the reversing of the vehicle, the first pattern P1 may be a lighting pattern or a flickering pattern, and the second pattern P2 may be a road surface pattern formed on a road surface around the vehicle at a predetermined angle to the centerline of the vehicle as in FIGS. 5 through 8. Like the first pattern P1, the second pattern P2 may remain illuminated or incrementally illuminated.

For example, similar to FIGS. 5 and 6, FIGS. 9 and 10 illustrate an example of a case where the second pattern P2 includes a plurality of pattern areas P21 through P23. In addition, similar to FIGS. 7 and 8, FIGS. 11 and 12 illustrate an example of a case where the second pattern P2 includes a single pattern area. In the following exemplary embodiments, the pattern areas P21 through P23 included in the second pattern P2 described above with reference to FIGS. 5, 6, 9 and 10 will be referred to as a first pattern area P21, a second pattern area P22, and a third pattern area P23, respectively.

Figure 13:
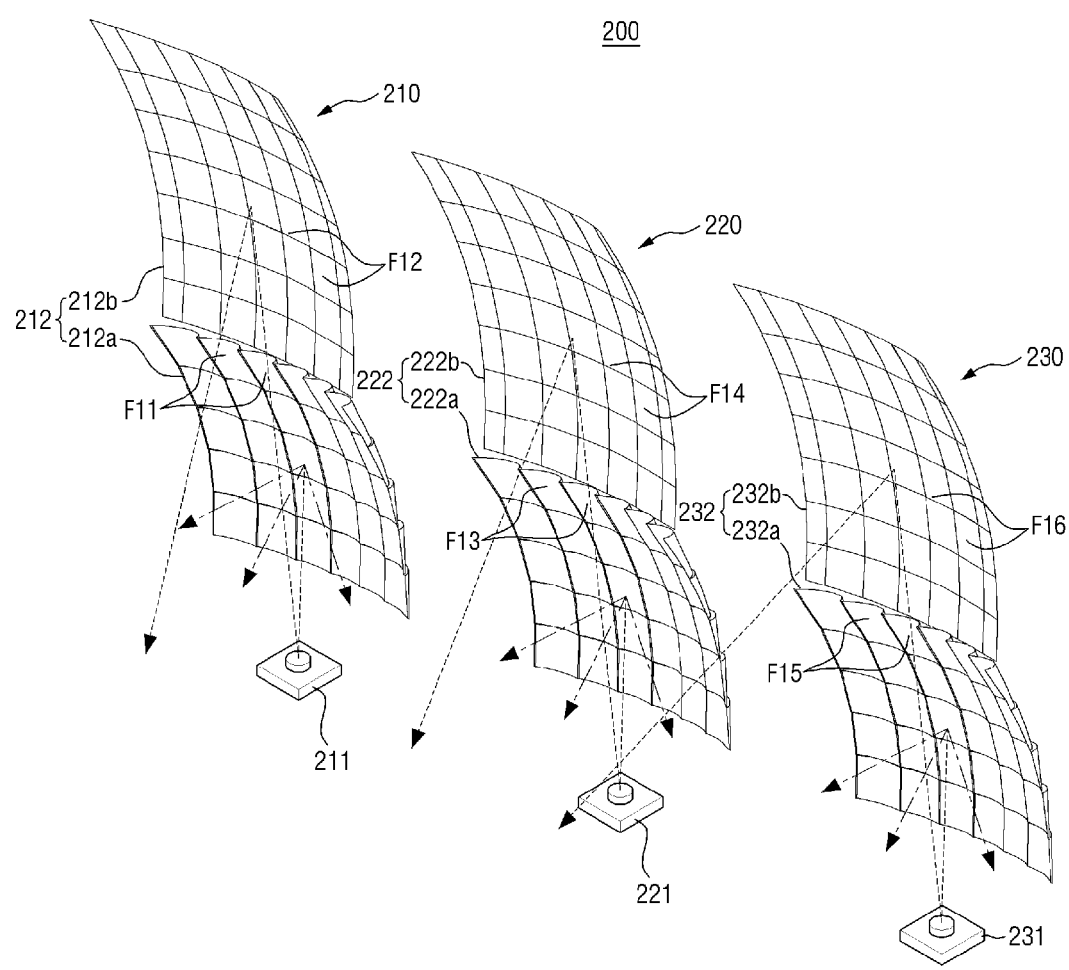
FIGS. 13 and 14 are exemplary schematic diagrams of a driving direction indicating unit according to an exemplary embodiment of the present disclosure.
Figure 14:
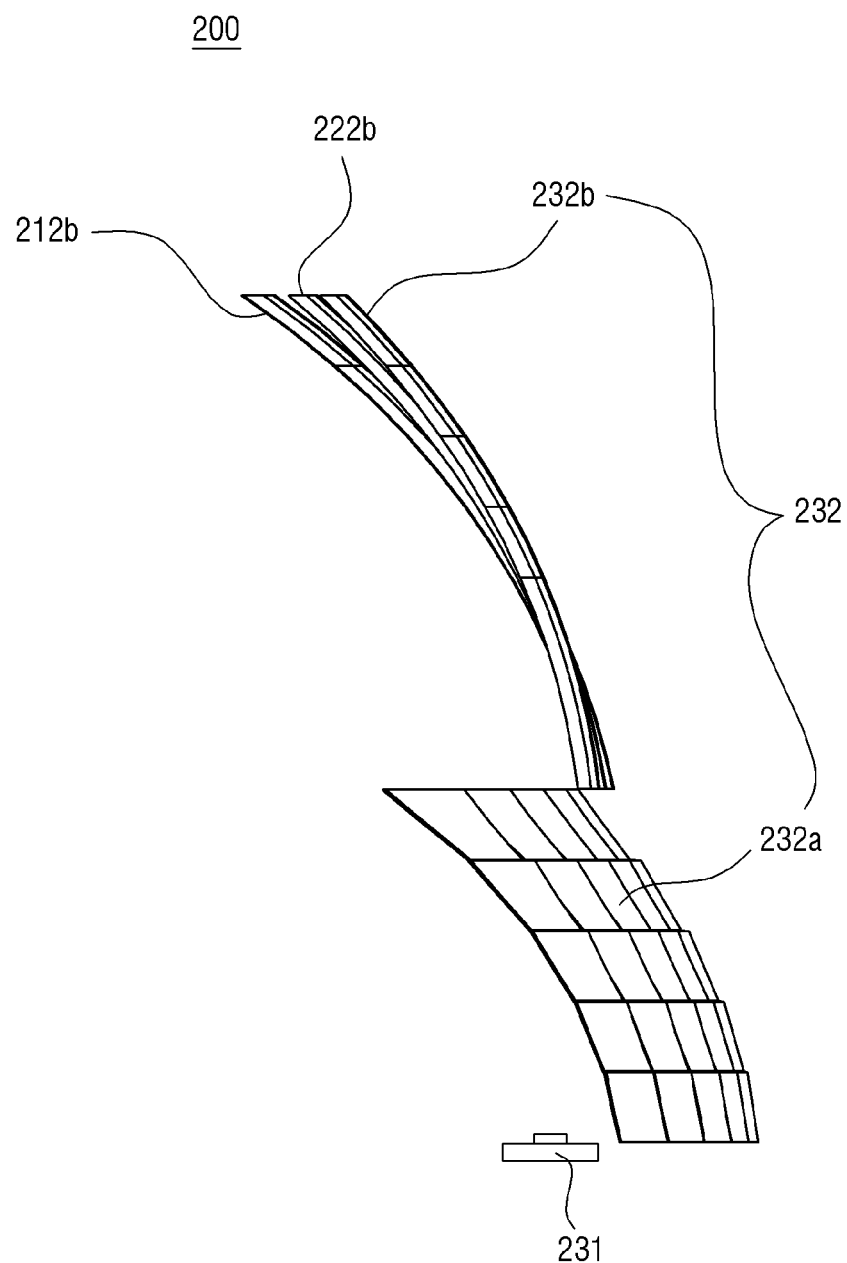

FIGS. 13 and 14 are exemplary schematic diagrams of a driving direction indicating unit 200 according to an exemplary embodiment. Referring to FIGS. 13 and 14, the driving direction indicating unit 200 according to the exemplary embodiment may include one or more lamp units 210 through 230. In the exemplary embodiment, a case where a plurality of lamp units 210 through 230 are provided will be described, and the lamp units 210 through 230 will be referred to as a first lamp unit 210, a second lamp unit 220, and a third lamp unit 230, respectively. In the exemplary embodiment, a case where the driving direction indicating unit 200 includes three lamp units and arranged in a widthwise direction of a vehicle will be described. However, the number or arrangement direction of lamp units included in the driving direction indicating unit 200 may be adjusted to various numbers or arrangement directions.

In other words, in FIGS. 13 and 14, an example of a case where a second pattern P2 includes a plurality of pattern areas P21 through P23 is illustrated. Therefore, the number or arrangement direction of lamp units included in the driving direction indicating unit 200 may vary according to the number of pattern areas included in the second pattern P2. When the second pattern P2 includes a plurality of pattern areas P21 through P23 as in FIGS. 5, 6, 9 and 10, the first through third lamp units 210 through 230 may respectively form the pattern areas P21 through P23. In other words, the number of the pattern areas P21 through P23 may vary based on the number of the lamp units 210 through 230.

Referring again to FIGS. 13 and 14, the first through third lamp units 210 through 230 may include first through third light sources 211 through 231 and first through third reflection units 212 through 232, respectively. The first through third reflection units 212 through 232 may respectively reflect light emitted in an upward direction from the first through third light sources 211 through 231 forward. In the exemplary embodiment, a case where at least one light-emitting diode (LED) is used as each of the first through third light sources 211 through 231 will be described and the number or color of light sources may vary based on the purpose of the vehicle lamp 1 of the inventive concept.

In the exemplary embodiment, when the first through third reflection units 212 through 232 reflect light forward, the first through third reflection units 212 through 232 reflect light in a light irradiation direction of the vehicle lamp 1 of the inventive concept. The direction meant by the term "forward" may vary according to the installation location or direction of the vehicle lamp 1 which varies according to the purpose of the vehicle lamp 1 of the inventive concept. In the exemplary embodiment, a case where the first through third reflection units 212 through 232 reflect light emitted in an upward direction from the first through third light sources 211 through 231 forward is described. However, the location of the first through third reflection units 212 through 232 may vary according to the direction in which light is emitted from the first through third light sources 211 through 231.

The first lamp unit 210 may include the first light source 211 and the first reflection unit 212, and the first reflection unit 212 may include a first reflector 212a and a second reflector 212b located above the first reflector 212a. Each of the first reflector 212a and the second reflector 212b may include a plurality of reflective surfaces F11 or F12. The first reflector 212a may form a first pattern P1 by reflecting a portion of light emitted from the first light source 211, and the second reflector 212b may form a first pattern area P21 of the second pattern P2 by reflecting the other portion of the light emitted from the first light source 211.

Figure 15:
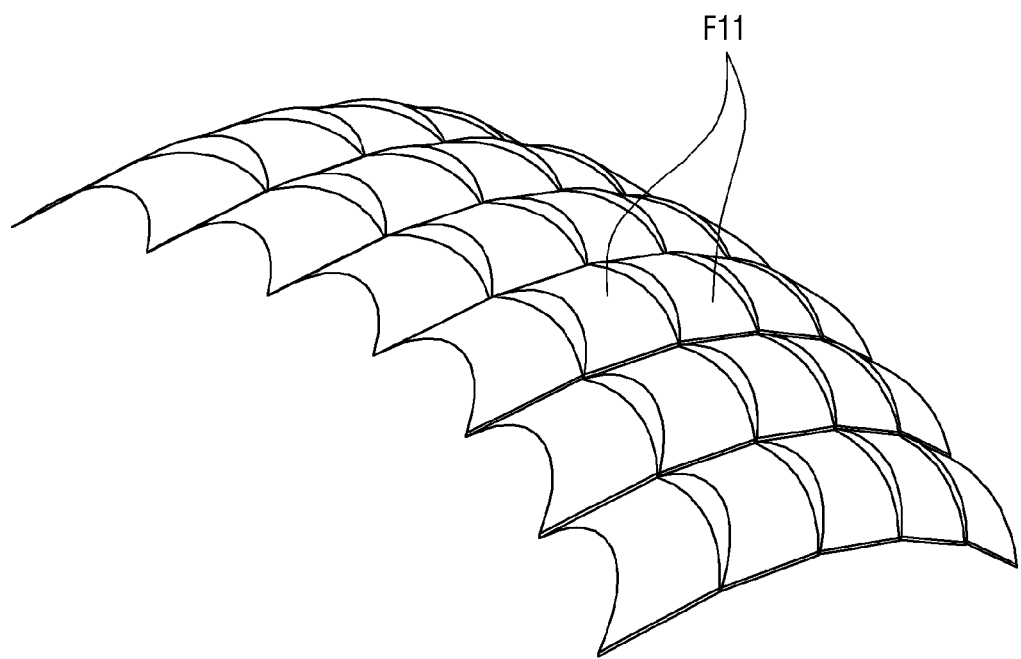
FIG. 15 is an exemplary schematic diagram of a reflector which forms a first pattern according to an exemplary embodiment of the present disclosure.
Figure 16:
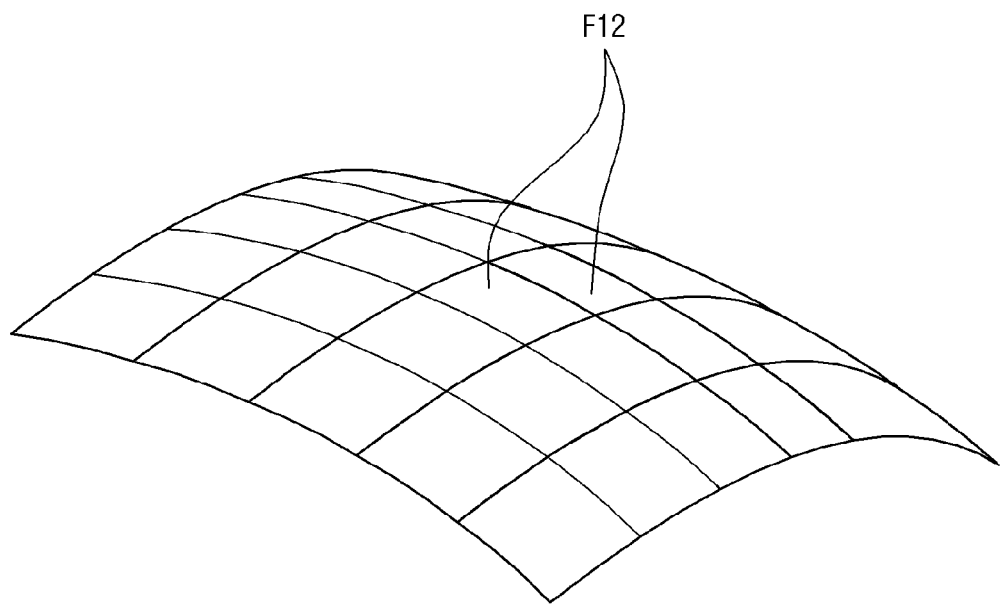
FIG. 16 is an exemplary schematic diagram of a reflector which forms a second pattern according to an exemplary embodiment of the present disclosure.
Figure 17:
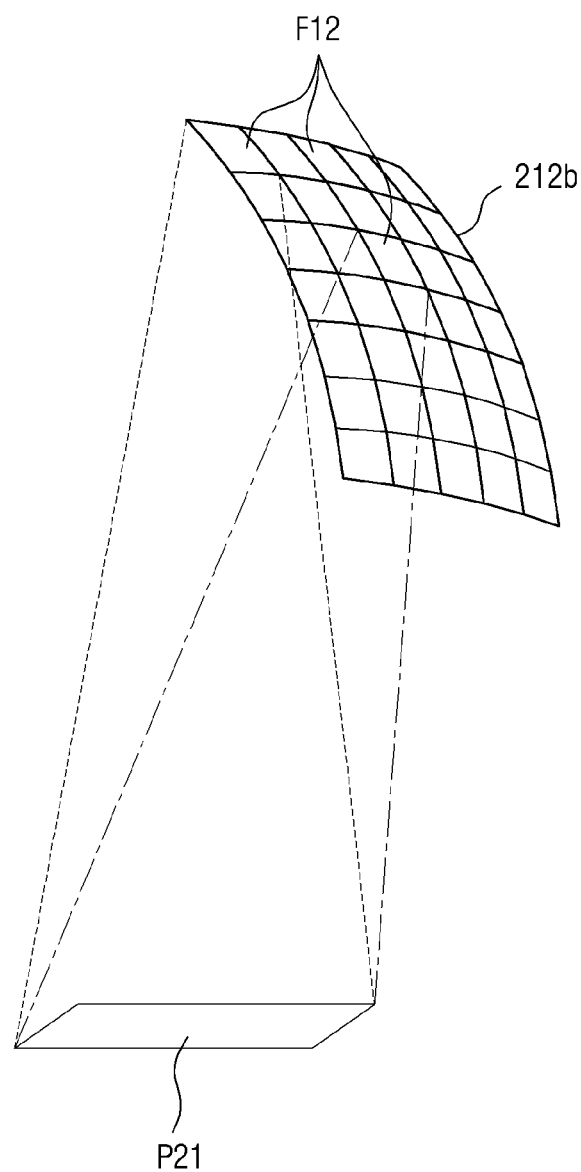
FIGS. 17 through 19 are exemplary schematic diagrams of a second pattern according to an exemplary embodiment of the present disclosure.

In the first reflection unit 212, a step difference between the reflective surfaces F11 of the first reflector 212a may be greater than a step difference between the reflective surfaces F12 of the second reflector 212b. Further, a curvature of each of the reflective surfaces F11 of the first reflector 212a may be greater than a curvature of each of the reflective surfaces F12 of the second reflector 212b as illustrated in FIGS. 15 and 16. Therefore, the first reflector 212a may disperse the light, and the second reflector 212b may concentrate light in a specific area, i.e., the first pattern area P21 of the second pattern P2. In other words, a beam of light may be irradiated to the first pattern area P21 by each reflective surface F12 of the second reflector 212b as illustrated in FIG. 17. Since the beams of light reflected respectively by the reflective surfaces F12 overlap each other in the first pattern area P21, they may increase illuminance, thereby improving visibility.

In the exemplary embodiment, the first reflector 212a and the second reflector 212b may be integrally formed with each other by, e.g., injection molding. In an example, an upper end of the first reflector 212a may be connected to a lower end of the second reflector 212b. In the exemplary embodiment, a large curvature denotes that a light incident surface is more concave, and a small curvature denotes that the light incident surface is relatively flatter. The second lamp unit 220 may include the second light source 221 and the second reflection unit 222. The second reflection unit 222 may include a third reflector 222a and a fourth reflector 222b disposed above the third reflector 222a. The third reflector 222a may form the first pattern P1 by reflecting a portion of light emitted from the second light source 221, and the fourth reflector 222b may form a second pattern area P22 of the second pattern P2 by reflecting the other portion of the light emitted from the second light source 221.

Figure 18:
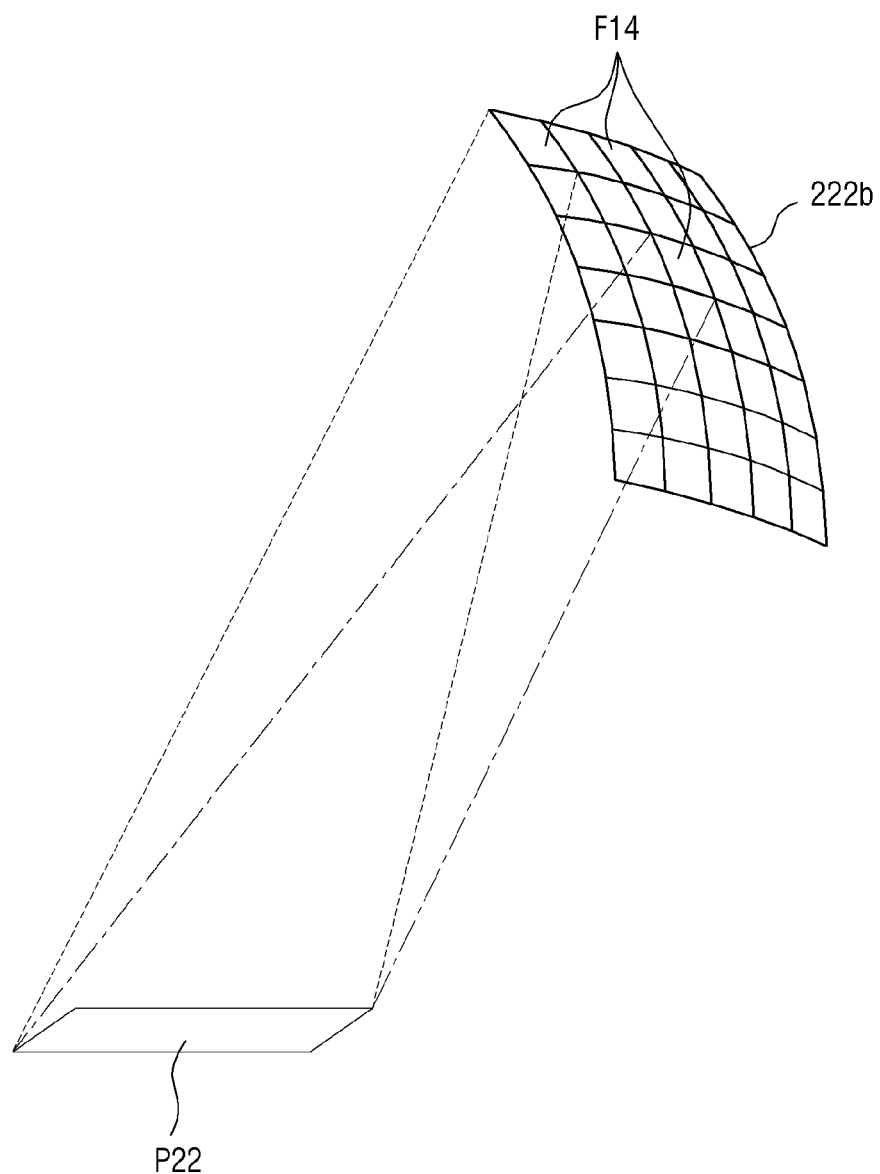

As in the first reflection unit 212, in the second reflection unit 222, a step difference between a plurality of reflective surfaces F13 of the second reflector 222a may be greater than a step difference between a plurality of reflective surfaces F14 of the fourth reflector 222b. Further, a curvature of each of the reflective surfaces F13 of the third reflector 222a may be greater than a curvature of each of the reflective surfaces F14 of the fourth reflector 222b. Therefore, the third reflector 222a may disperse light, and the fourth reflector 222b may concentrate light in a specific area, i.e., the second pattern area P22 of the second pattern P2. In other words, a beam of light may be irradiated to the second pattern area P22 by each reflective surface F14 of the fourth reflector 222b as illustrated in FIG. 18. Since the beams of light reflected respectively by the reflective surfaces F14 overlap each other in the second pattern area P22, they may increase illuminance, thereby improving visibility.

In the exemplary embodiment, the second pattern area P22 may be formed at a position a greater distance from the vehicle than the first pattern area P21. In particular, the fourth reflector 222b may be angled more rearward, i.e., more toward the interior of the vehicle than the second reflector 212b. In the exemplary embodiment, the third reflector 222a and the fourth reflector 222b may be integrally formed with each other by, e.g., injection molding. In an example, an upper end of the third reflector 222a may be connected to a lower end of the fourth reflector 222b.

The third lamp unit 230 may include the third light source 231 and the third reflection unit 232, and the third reflection unit 232 may include a fifth reflector 232a and a sixth reflector 232b located above the fifth reflector 232a. The fifth reflector 232a may form the first pattern P1 by reflecting a first portion of light emitted from the third light source 231, and the sixth reflector 232b may form a third pattern area P23 of the second pattern P2 by reflecting the second portion of the light emitted from the third light source 231.

Figure 19:
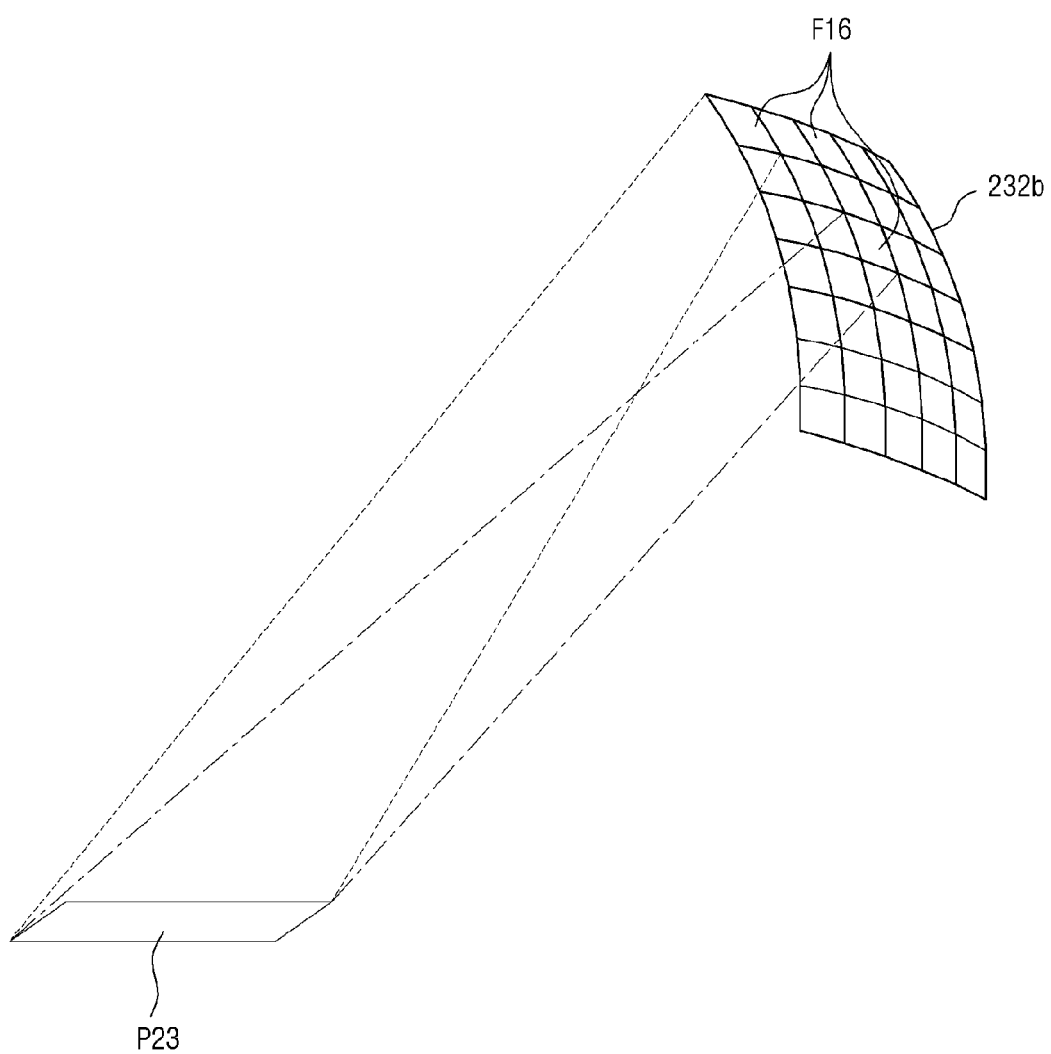

As in the first reflection unit 212 and the second reflection unit 222, in the third reflection unit 232, a step difference between a plurality of reflective surfaces F15 of the fifth reflector 232a may be greater than a step difference between a plurality of reflective surfaces F16 of the sixth reflector 232b. A curvature of each of the reflective surfaces F15 of the fifth reflector 232a may be greater than a curvature of each of the reflective surfaces F16 of the sixth reflector 232b. Therefore, the fifth reflector 232a may disperse light and the sixth reflector 232b may concentrate light in a specific area, i.e., the third pattern area P23 of the second pattern P2. In other words, a beam of light may be irradiated to the third pattern area P23 by each reflective surface F16 of the sixth reflector 232b as illustrated in FIG. 19. Since the beams of light reflected respectively by the reflective surfaces F16 overlap each other in the third pattern area P23, they may increase illuminance, thereby improving visibility.

In the exemplary embodiment, the third pattern area P23 may be formed at a position a greater distance from the vehicle than the second pattern area P22. In particular, the sixth reflector 232b may be angled more rearward, i.e., more toward the interior of the vehicle than the fourth reflector 222b. In the exemplary embodiment, the fifth reflector 232a and the sixth reflector 232b may be integrally formed with each other by, e.g., injection molding. For example, an upper end of the fifth reflector 232a may be connected to a lower end of the sixth reflector 232b.

In the exemplary embodiment, a case where the second reflector 212b forms the first pattern area P21, the fourth reflector 222b forms the second pattern area P22, and the sixth reflector 232b forms the third pattern area P23 is described. However, this is merely an example used to help understand the inventive concept, and each of the second reflector 212b, the fourth reflector 222b and the sixth reflector 232b may form any one of the first through third pattern areas P21 through P23 and may be angled to a different degree based on the location of a pattern area formed.

In the above-described exemplary embodiment, a case where the first reflector 212a and the second reflector 212b are integrally formed with each other, the third reflector 222a and the fourth reflector 222b are integrally formed with each other, and the fifth reflector 232a and the sixth reflector 232b are integrally formed with each other is described. However, all of the first reflector 212a, the second reflector 212b, the third reflector 222a, the fourth reflector 222b, the fifth reflector 232a and the sixth reflector 232b may also be integrally formed with each other by, e.g., injection molding. For example, when the first reflector 212a and the second reflector 212b, the third reflector 222a and the fourth reflector 222b, and the fifth reflector 232a and the sixth reflector 232b are integrally formed instead of separately, the space needed to locate each reflector may be reduced, the structure may be simplified, and costs may be reduced.

In the exemplary embodiment, a lens for controlling light distribution is not used to form the second pattern P2 which is a road surface pattern. Instead, beams of light emitted from the first through third light sources 211 through 231 may be respectively reflected by the second reflector 212b, the fourth reflector 222b and the sixth reflector 232b to form a road surface pattern. Since a component such as a lens may be omitted, the structure may be simplified, and costs may be reduced.

In the above-described exemplary embodiment, a case where the second reflector 212b, the fourth reflector 222b and the sixth reflector 232b respectively form the first, second and third pattern areas P21, P22 and P23 of the second pattern P2 is described. However, the second reflector 212b, the fourth reflector 222b and the sixth reflector 232b may also form the first pattern P1 in addition to the second pattern P2. For example, each of the second reflector 212b, the fourth reflector 222b and the sixth reflector 232b may be divided into an area A1 which forms the second pattern P2 and an area A2 which forms the first pattern P1 as illustrated in FIG. 20.

Figure 20:
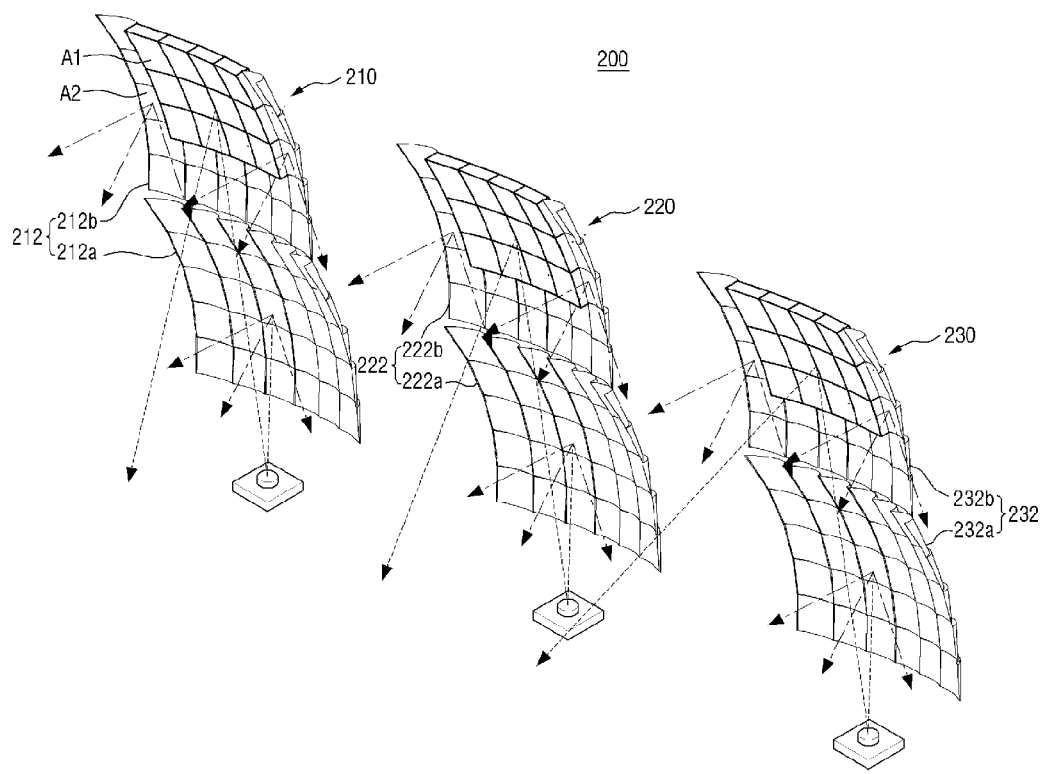
FIG. 20 is an exemplary schematic diagram of reflectors which form a first pattern and a second pattern simultaneously according to an exemplary embodiment of the present disclosure.

In FIG. 20, a case where the second reflector 212*b* may be divided into the area A1 which forms the second pattern P2 and the area A2 which forms the first pattern P1 is described as an example. However, the fourth reflector 222*b* and the sixth reflector 232*b* may also be formed in a similar way to the second reflector 212*b*. In addition, in FIG. 20, a case where the area A1 which forms the second pattern P2 may be located in a central portion of the second reflector 212*b* is described as an example. However, the location of the area A1 which forms the second pattern P2 may vary according to the location of a pattern area in the second pattern P2 formed by the second reflector 212*b*.

Each of the area A1 which forms the second pattern P2 and the area A2 which forms the first pattern P1 may include a plurality of reflective surfaces. As in the above-described embodiment, a curvature of each of the reflective surfaces of the area A2 which forms the first pattern P1 may be greater than a curvature of each of the reflective surfaces of the area A1 which forms the second pattern P2. A step difference between the reflective surfaces of the area A2 which forms the first pattern P1 may be greater than a step difference between the reflective surfaces of the area A1 which forms the second pattern P2. Therefore, the area A2 which forms the first pattern P1 may disperse light.

When the area A2 which forms the first pattern P1, in addition to the area A1 which forms the second pattern P2, is formed in each of the second reflector 212*b*, the fourth reflector 222*b* and the sixth reflector 232*b* which form the second pattern P2, the amount of light which forms the first pattern P1 may be increased, thereby improving visibility. In the above-described exemplary embodiment, a case where one or more lamp units 210 through 230 form both the first pattern P1 and the second pattern P2 is described. However, separate lamp units may also be installed to form the first pattern P1 and the second pattern P2, respectively.

Figure 21:
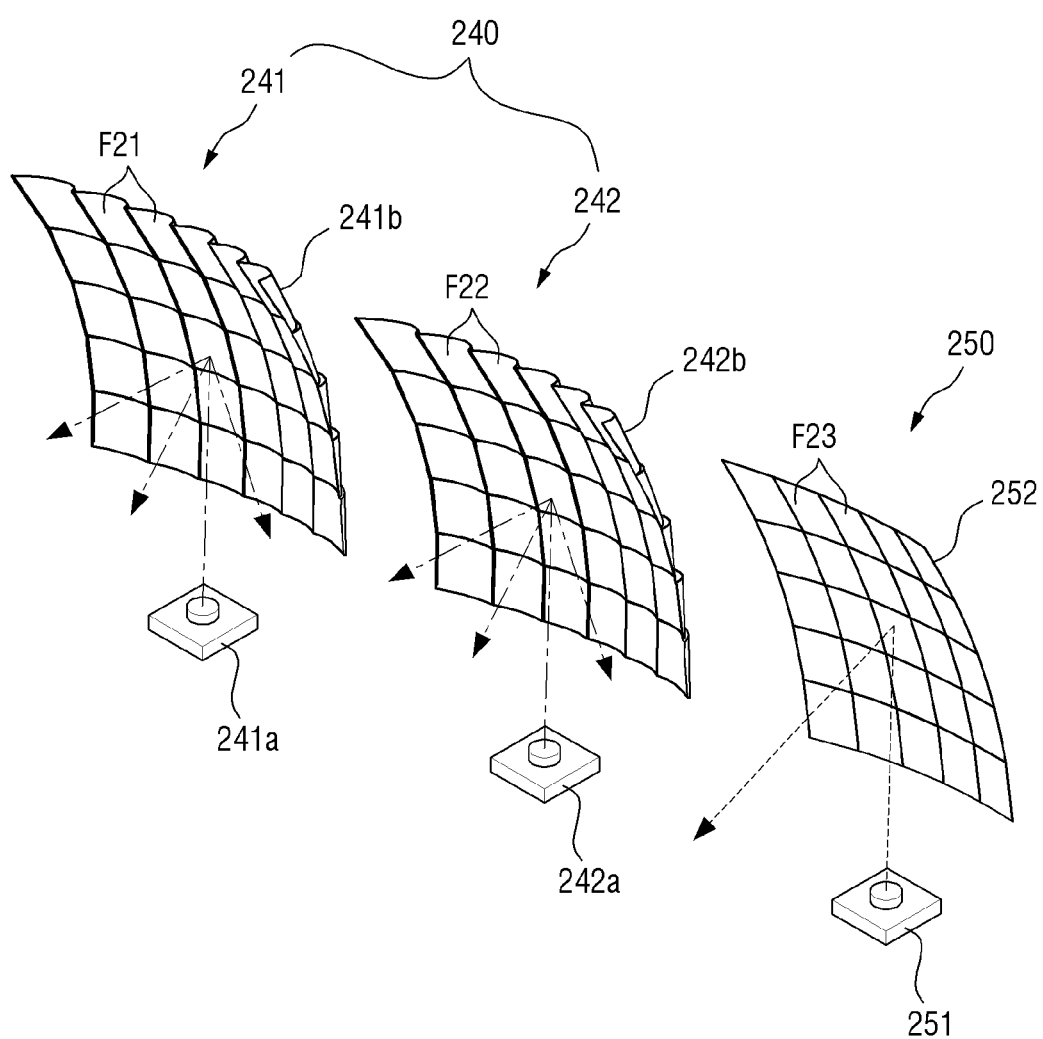
FIG. 21 is an exemplary schematic diagram of a driving direction indicating unit according to an exemplary embodiment of the present disclosure.

FIG. 21 is an exemplary schematic diagram of a driving direction indicating unit 200 according to an exemplary embodiment. Referring to FIG. 21, the driving direction indicating unit 200 according to the exemplary embodiment may include a first lamp assembly 240 and a second lamp assembly 250. The first lamp assembly 240 may form a first pattern P1, and the second lamp assembly 250 may form a second pattern P2. The first lamp assembly 240 may include a plurality of lamp units 241 and 242 arranged in a widthwise direction of a vehicle. However, the inventive concept is not limited thereto, and the number or arrangement direction of the lamp units 241 and 242 may be changed to various numbers or arrangement directions.

The lamp units 241 and 242 may respectively include light sources 241*a* and 242*a* and reflection units 241*b* and 242*b* which may form the first pattern P1 by reflecting light emitted upward from the light sources 241*a* and 242*a* forward. The reflection unit 241*b* or 242*b* of each of the lamp units 241 and 242 may include a plurality of reflective surfaces F21 or F22. A direction in which light is reflected may vary based on an angle of reflection of each of the reflective surfaces F21 or F22.

The second lamp assembly 250 may include a light source 251 and a reflection unit 252. The reflection unit 252 may form the second pattern P2 by reflecting light emitted in an upward direction from the light source 251 forward. In the exemplary embodiment, a case where the first lamp assembly 210 and the second lamp assembly 220 are arranged in the widthwise direction of the vehicle is described. However, the arrangement direction of the first lamp assembly 210 and the second lamp assembly 220 may be changed to various arrangement directions.

The reflection unit 252 of the second lamp assembly 250 may include a plurality of reflective surfaces F23. A step difference between the reflective surfaces F23 of the reflection unit 252 may be less than a step difference between the reflective surfaces F21 or F22 of the reflection unit 241*b* or 242*b* included in each of the lamp units 241 and 242. A curvature of each of the reflective surfaces F23 of the reflection unit 252 may be less than a curvature of each of the reflective surfaces F21 or F22 of the reflection unit 241*b* or 242*b* included in each of the lamp units 241 and 242. Therefore, the reflection unit 252 may concentrate light in a specific area.

Figure 22:
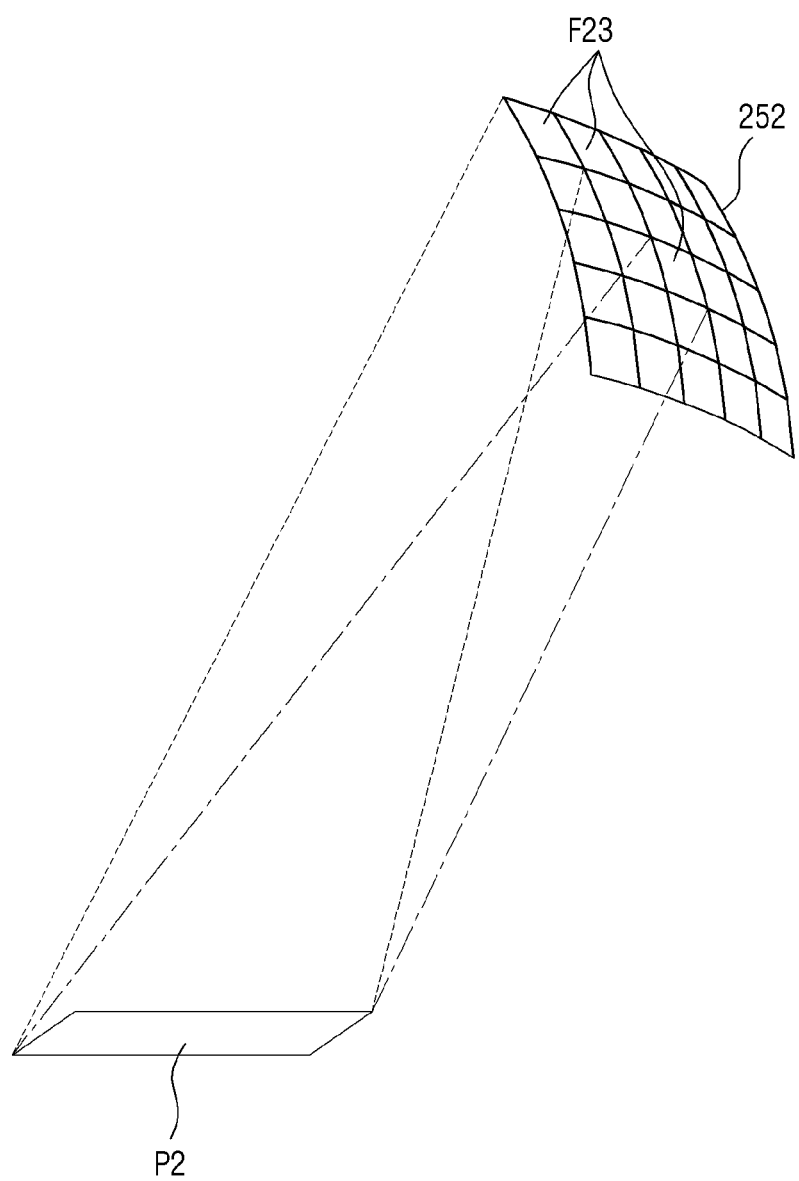
FIG. 22 is an exemplary schematic diagram of a second pattern according to an exemplary embodiment of the present disclosure.

For example, since the step difference between or the respective curvatures of the reflective surfaces F21 or F22 of the reflection unit 241*b* or 242*b* included in each of the lamp units 241 and 242 may be greater, light may be spread. Conversely, since the step difference between or the respective curvatures of the reflective surfaces F23 of the reflection unit 252 may be smaller than the step difference between or the respective curvatures of the reflective surfaces F21 or F22 of the reflection unit 241*b* or 242*b* included in each of the lamp units 241 and 242, light may be concentrated in a specific area. Therefore, illuminance may be increased, thereby improving visibility. In other words, in the exemplary embodiment, since beams of light reflected respectively by the reflective surfaces F23 of the reflection unit 252 of the second lamp assembly 250 overlap each other in a pattern area of the second pattern P2 as illustrated in FIG. 22, they may increase illuminance, thereby improving visibility. In FIG. 22, a case where the driving direction indicating unit 200 forms a single pattern area as the second pattern P2 is described as an example. However, the inventive concept is not limited to this case, and the second pattern P2 may also be composed of a plurality of pattern areas.

Figure 23:
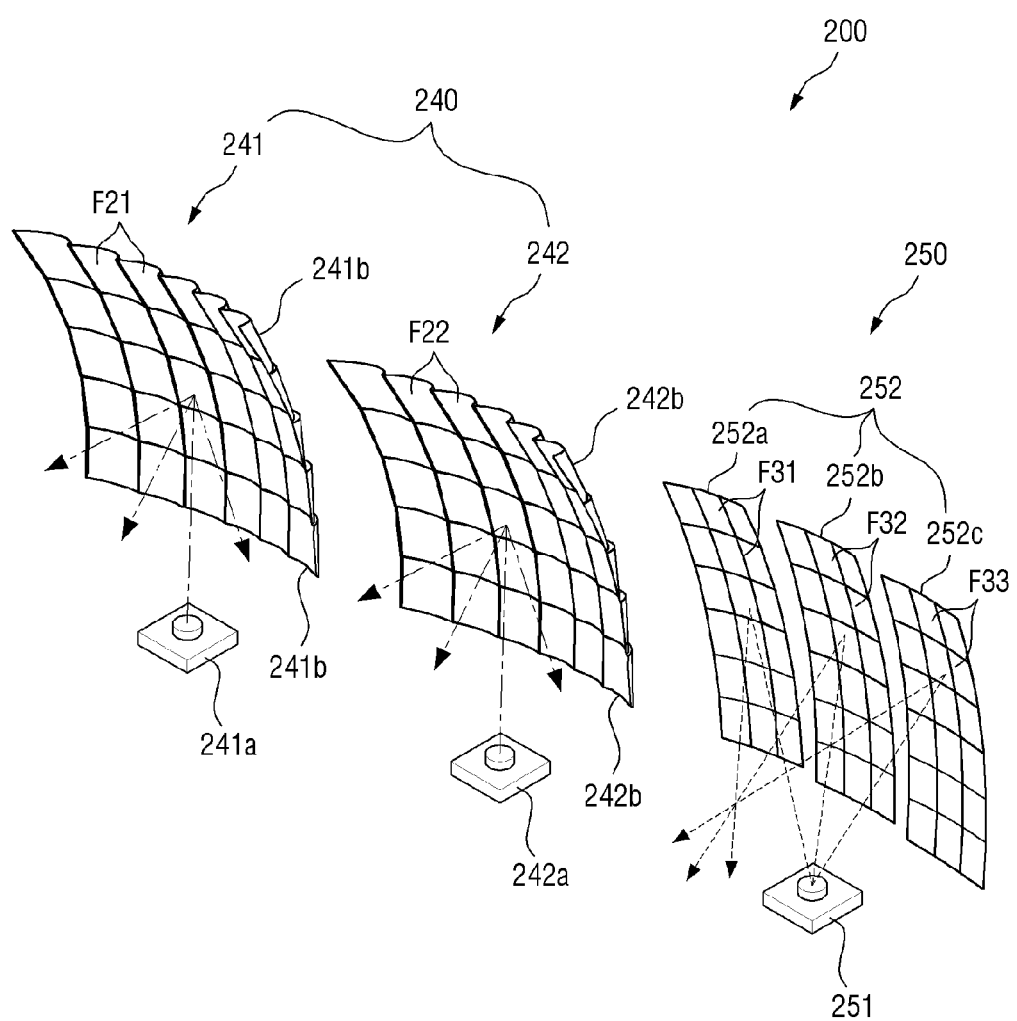
FIGS. 23 and 24 are exemplary schematic diagrams of a driving direction indicating unit according to an exemplary embodiment of the present disclosure.
Figure 24:
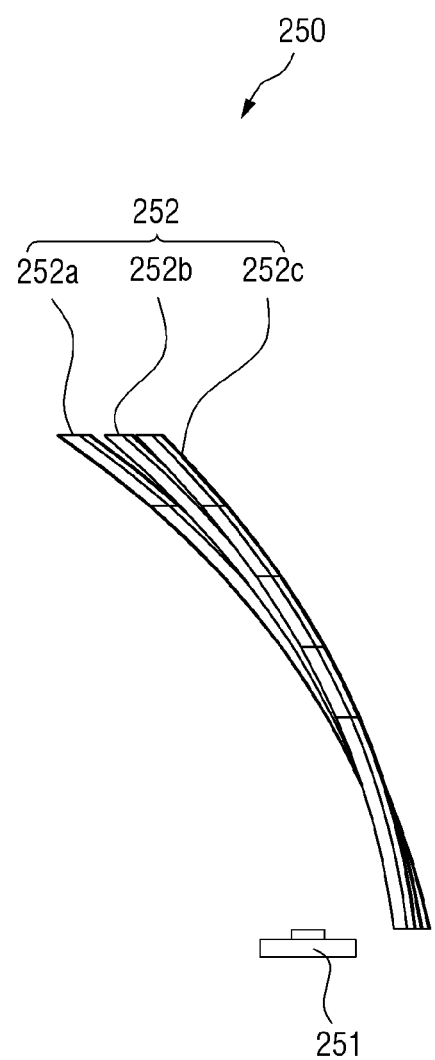

FIGS. 23 and 24 are exemplary schematic diagrams of a driving direction indicating unit 200 according to an exemplary embodiment. Referring to FIGS. 23 and 24, the driving direction indicating unit 200 according to the exemplary embodiment may include a first lamp assembly 240 and a second lamp assembly 250 as in FIG. 21 described above. The first lamp assembly 240 may form a first pattern P1, and the second lamp assembly 250 may form a second pattern P2. The first lamp assembly 240 may include a plurality of lamp units 241 and 242 arranged in a widthwise direction of a vehicle. The lamp units 241 and 242 may respectively include light sources 241*a* and 242*a* and reflection units 241*b* and 242*b* which form the first pattern P1 by reflecting light emitted upward from the light sources 241*a* and 242*a* forward.

In the exemplary embodiment, a reflection unit 252 of the second lamp assembly 250 may include first through third reflectors 252*a* through 252*c*, and the first through third reflectors 252*a* through 252*c* may respectively form a plurality of pattern areas P21 through P23 of the second pattern P2 as in FIGS. 5, 6, 9 and 12. In the exemplary embodiment, a case where the first through third reflectors 252*a* through 252*c* are separated from each other is described. However, this is merely an example used to help understand the inventive concept, and the first through third reflectors 252*a* through 252*c* may also be at least partially connected to each other. In this case, at least part of each of the first through third reflectors 252*a* through 252*c* may be placed to have a step difference with another reflector according to a pattern area that the first, second or third reflector 252*a*, 252*b* or 252*c* forms among the pattern areas P21 through P23.

In the exemplary embodiment, a case where the reflection unit 252 of the second lamp assembly 250 includes three reflectors 252a through 252c is described. However, this is merely because the second pattern P2 includes three pattern areas P21 through P23, and the number of reflectors included in the reflection unit 252 of the second lamp assembly 250 may vary according to the number of pattern areas included in the second pattern P2.

Each of the first through third reflectors 252a through 252c may form any one of the first through third pattern areas P21 through P23 and may have a different slope based on a pattern area that it forms. For example, when the first reflector 252a, the second reflector 252b and the third reflector 252c form the first pattern area P21, the second pattern area P22 and the third pattern area P23, respectively, the slope toward the interior of the vehicle may increase in order of the first reflector 252a, the second reflector 252b and the third reflector 252c. In other words, a reflector which forms a pattern area at a location farthest away from the vehicle among the first through third pattern areas P21 through P23 may be angled most toward the interior of the vehicle.

Each of the first through third reflectors 252a through 252c may include a plurality of reflective surfaces F31, F32 or F33. As in FIG. 22 described above, the reflective surfaces F31, F32 or F33 may cause beams of light to overlap each other in any one of the first through third pattern areas P21 through P23, thereby increasing illuminance, which, in turn, may improve visibility. In the exemplary embodiment, a case where the first through third reflectors 252a through 252c respectively form the first through third pattern areas P21 through P23 is described. However, this is merely an example used to help understand the inventive concept, and each of the first through third reflectors 252a through 252c may form any one of the first through third pattern areas P21 through P23 according to its slope.

In the exemplary embodiment, each of the pattern areas P21 through P23 may have an at least partially different size according to an angle of reflection of the reflective surfaces F31, F32 or F33 of one of the first through third reflectors 252a through 252c. In the current exemplary embodiment, a case where the second lamp assembly 250 uses a single light source 251 is described. However, separate light sources may also be used for the first reflector 252a, the second reflector 252b, and the third reflector 252c, respectively.

The control unit 300 may be configured to adjust (e.g., change or control) the driving direction indicating unit 200 installed on at least one side of the front or back of the vehicle to display the driving direction of the vehicle based on the sensing result of the driving direction sensing unit 100. For example, the control unit 300 may form the first pattern P1 and the second pattern P2 described above by altering (e.g., controlling) power to be supplied to the driving direction indicating unit 200 installed on at least one side of the front or back of the vehicle according to the sensed driving direction of the vehicle. Cases where the control unit 300 according to the exemplary embodiment forms the first pattern P1 and the second pattern P2 according to the driving direction of the vehicle will now be described with reference to FIGS. 25 through 28.

Figure 25:
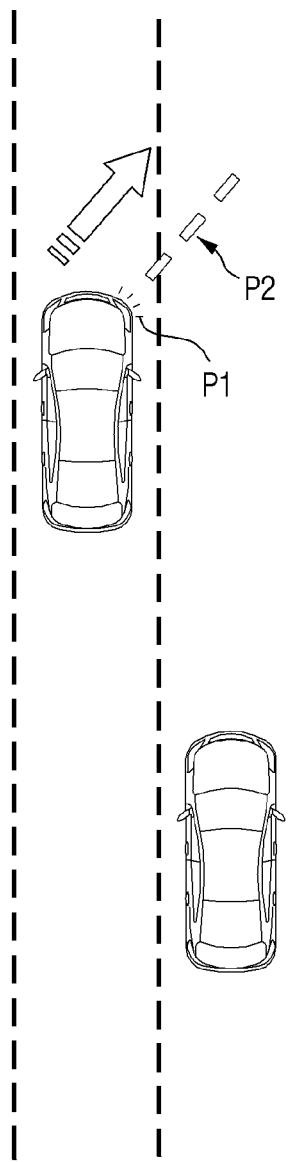
FIG. 25 is an exemplary schematic diagram of a first pattern and a second pattern formed when a vehicle changes lanes according to an exemplary embodiment of the present disclosure.

In FIGS. 25 through 28, an example of a case where a second pattern P2 includes a plurality of pattern areas P21 through P23 is illustrated. However, the same description may apply to a case where the second pattern P2 includes a single pattern area. FIG. 25 illustrates an example of a case where a vehicle changes lanes. Referring to FIG. 25, a vehicle located behind a preceding vehicle which attempts to change lanes may more easily recognize a lane to the preceding vehicle is to move through a second pattern P2 formed together with a first pattern P1. Therefore, the vehicle may maintain a safety distance.

Figure 26:
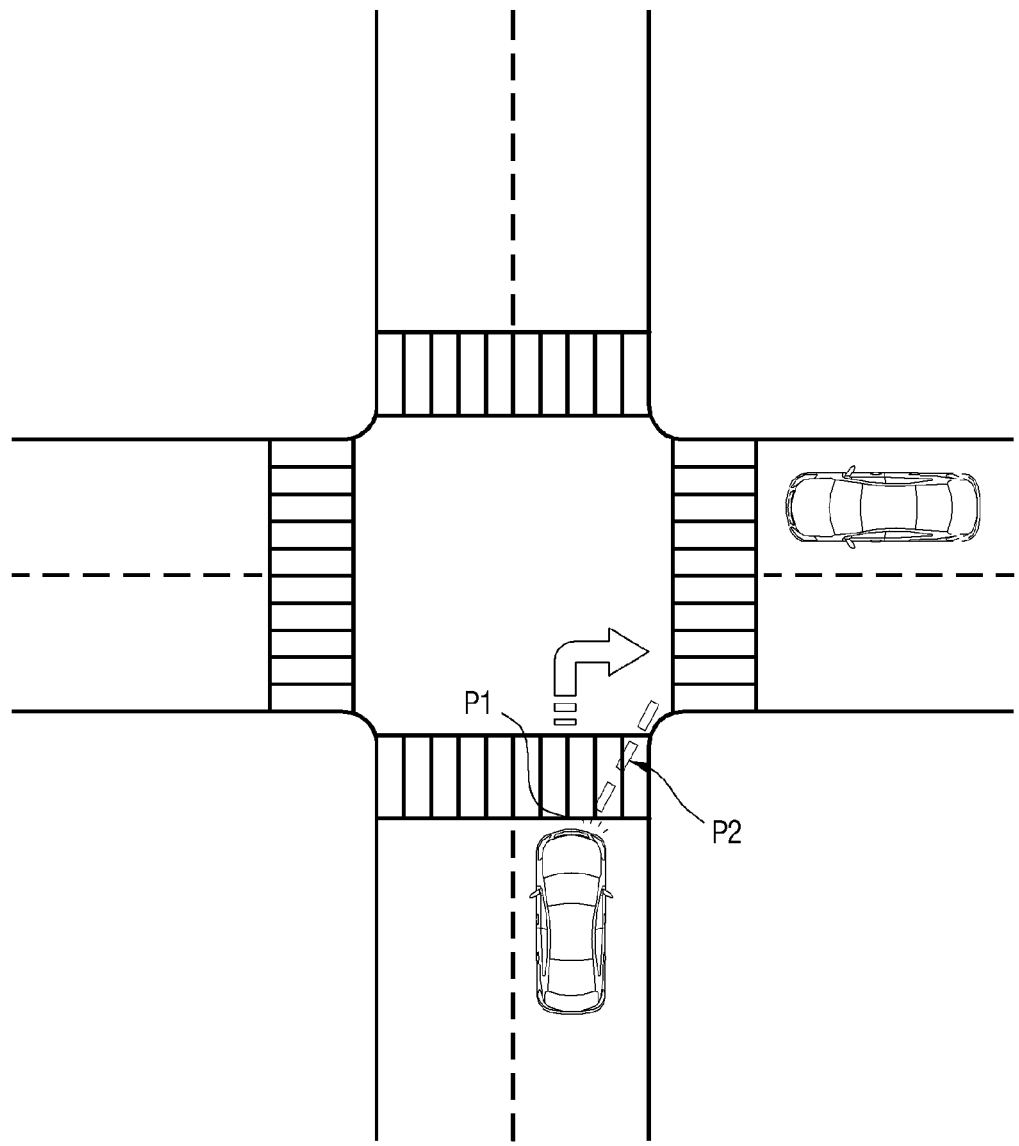
FIG. 26 is an exemplary schematic diagram of a first pattern and a second pattern formed at a crossroads according to an exemplary embodiment of the present disclosure.

FIG. 26 illustrates an example of a case where a vehicle indicates its turning direction at a crossroads. Referring to FIG. 26, when a vehicle turns right at a crossroads, the control unit 300 may be configured to adjust the driving direction indicating unit 200 installed on a front right side of the vehicle to form a first pattern P1 and a second pattern P2. Therefore, another vehicle coming from the turning direction of the vehicle at the crossroads may more easily recognize the driving direction of the vehicle.

Figure 27:
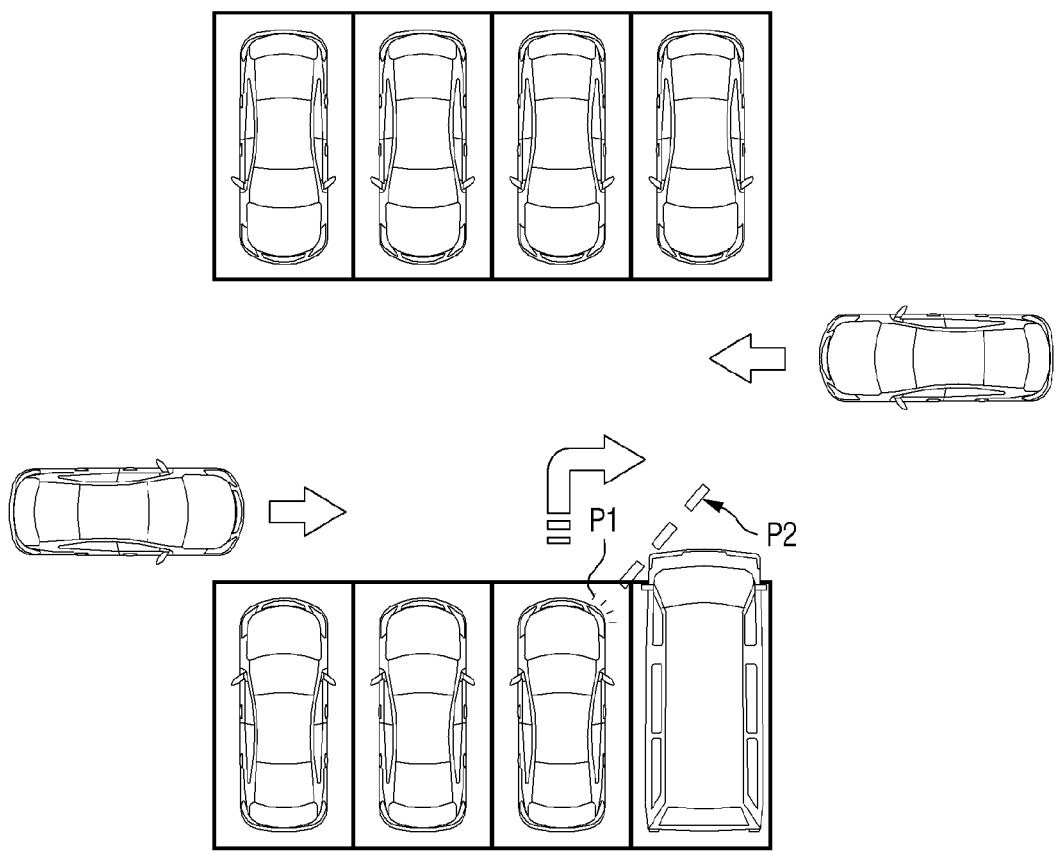
FIGS. 27 and 28 are exemplary schematic diagrams of a first pattern and a second pattern formed when a vehicle moves out of an area in a parking lot according to an exemplary embodiments of the present disclosure.

FIG. 27 illustrates an example of a case where a vehicle indicates its turning direction when driving forward to move out of an area in a parking lot. Referring to FIG. 27, when a vehicle turns right in a parking lot, the control unit 300 may be configured to adjust the driving direction indicating unit 200 installed on a front right side of the vehicle to form a first pattern P1 and a second pattern P2. In FIG. 27, even when a large vehicle is parked proximate to the vehicle, the second pattern P2 may indicate the driving direction of the vehicle to nearby vehicles or pedestrians coming from the turning direction of the vehicle. Therefore, it is possible to prevent a car accident caused by failing to notice the vehicle moving out of an area in the parking lot.

Figure 28:
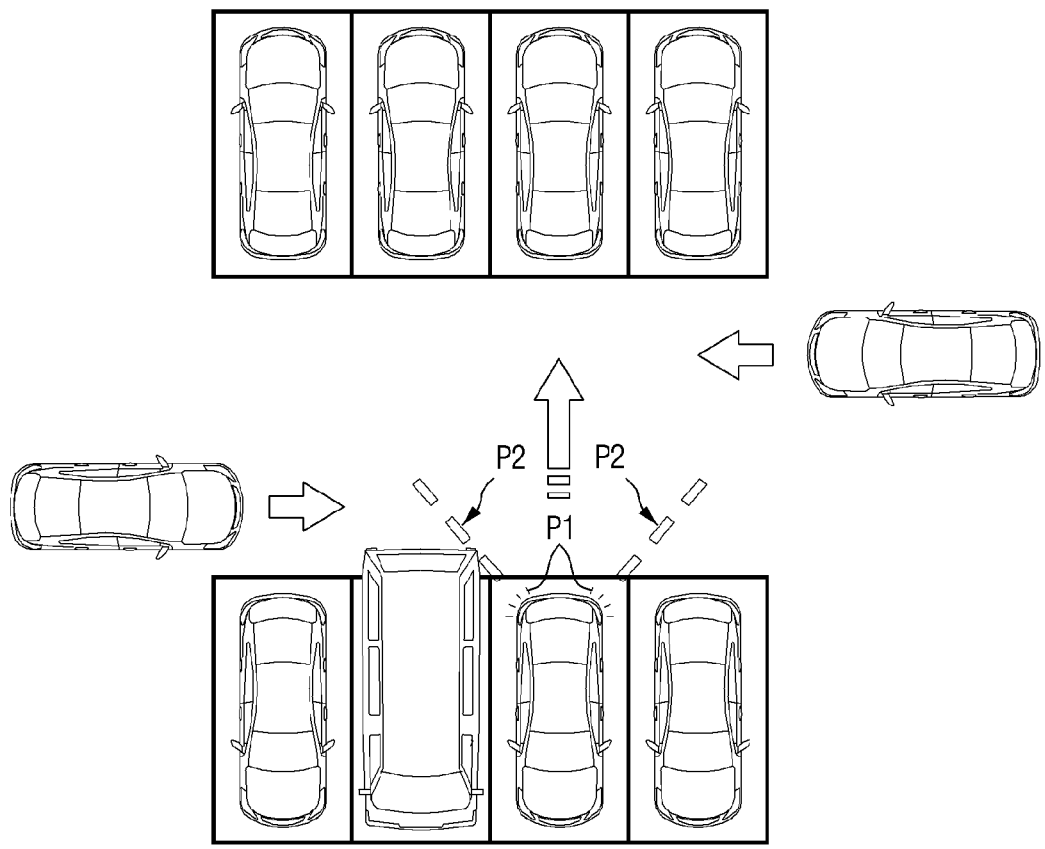

FIG. 28 illustrates an example of a case where a vehicle drives in reverse to move out of an area in a parking lot. Referring to FIG. 28, when a vehicle reverses in a parking lot, the control unit 300 may be configured to adjust the driving direction indicating units 200 installed on both sides of the back of the vehicle to form a first pattern P1 and a second pattern P2. In FIG. 28, even when a large vehicle is parked proximate to the vehicle, the second pattern P2 may indicate the reversing of the vehicle to nearby vehicles or pedestrians, thereby preventing a car accident.

Figure 29:
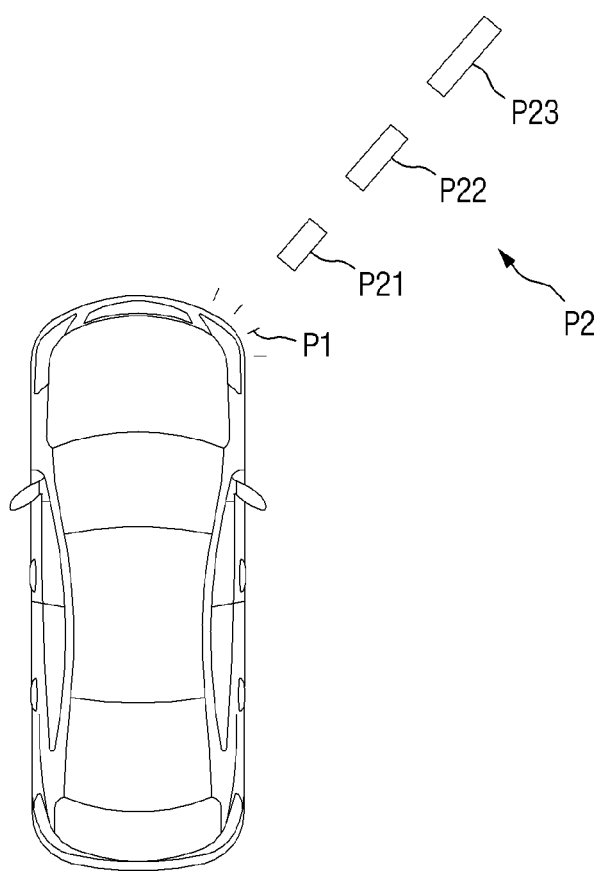
FIGS. 29 and 30 are exemplary schematic diagrams of a second pattern having pattern areas of different sizes according to an exemplary embodiment of the present disclosure.
Figure 30:
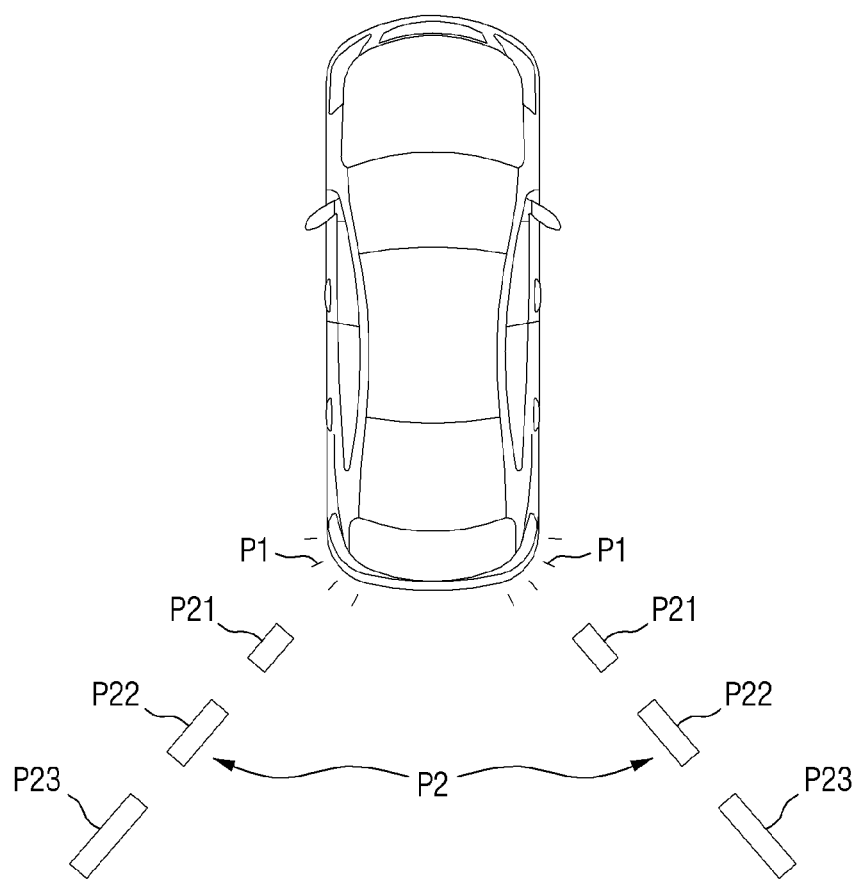

In the above-described exemplary embodiments, a case where the first through third pattern areas P21 through P23 included in the second pattern P2 have the about same size is described. However, the first through third pattern areas P21 through P23 may also have different sizes as illustrated in FIGS. 29 and 30. For example, an area to which light reflected by each of the second reflector 212b, the fourth reflector 222b and the sixth reflector 232b of FIG. 13 is irradiated may vary according to the step difference between the reflective surfaces F12, F14 or F16 of the second reflector 212b, the fourth reflector 222b or the sixth reflector 232b or according to the curvature of each of the reflective surfaces F12, F14 or F16.

Therefore, the first through third pattern areas P21 through P23 of the second pattern P2 may be formed to have different sizes as illustrated in FIGS. 29 and 30 by adjusting the step difference between the reflective surfaces F12, F14 or F16 or the curvature of each of the reflective surfaces F12, F14 or F16. In FIGS. 29 and 30, a case where the first through third pattern areas P21 through P23 become gradually larger as the distance from a vehicle increases is described as an example. However, at least some of the first through third pattern areas P21 through P23 may have different sizes.

As described above, the vehicle lamp 1 of the inventive concept indicates the turning direction or reversing of a vehicle not only through a first pattern P1 such as an illumination pattern or a flickering pattern but also through a second pattern P2 formed on a road surface around the vehicle. Therefore, vehicles or pedestrians around the vehicle may more easily recognize the driving direction of the vehicle even at a location where it is difficult to notice the first pattern P1 and may cope with the situation. This may prevent car or pedestrian accidents.

A vehicle lamp according provides at least one of the following advantages. Since a pattern indicating a driving direction of a vehicle is formed on a road surface around the vehicle, vehicles or pedestrians around the vehicle may more easily recognize the driving direction of the vehicle and rapidly adapt with the situation. Therefore, the likelihood of car accidents may be reduced. However, the effects of the inventive concept are not restricted to the one set forth herein. The above and other effects of the inventive concept will become more apparent to one of daily skill in the art to which the inventive concept pertains by referencing the claims.

While this invention has been described in connection with what is presently considered to be exemplary embodiments on the contrary, it is intended to cover various modifications and equivalent arrangements, without departing from the scope and spirit of the invention as disclosed in the accompanying claims. In addition, it is to be considered that all of these modifications and alterations fall within the scope of the present invention.

What is claimed is:

1. A vehicle lamp, comprising:
    a driving direction sensing unit configured to sense a driving direction of a vehicle;
    a driving direction indicating unit configured to form a first pattern that indicates the driving direction and forms a second pattern that indicates the driving direction on a road surface around the vehicle; and
    a control unit configured to adjust the driving direction indicating unit according to the sensed driving direction,
    wherein the driving direction indicating unit includes at least one lamp unit,
    wherein the at least one lamp unit includes a light source and a reflection unit having a plurality of reflectors which form the first pattern and the second pattern, respectively,
    wherein each of the reflectors includes a plurality of reflective surfaces, and
    wherein a curvature of each reflective surface of the reflector which forms the first pattern is greater than a curvature of each reflective surface of the reflector which forms the second pattern.

2. The vehicle lamp of claim 1, wherein the at least one lamp unit includes a plurality of lamp units, and
    wherein the lamp units are disposed in a widthwise direction of the vehicle.

3. The vehicle lamp of claim 1, wherein the second pattern includes a plurality of pattern areas, and the at least one lamp unit includes a plurality of lamp units, each forming any one of the pattern areas.

4. The vehicle lamp of claim 3, wherein a reflector which forms the second pattern among the reflectors included in each of the lamp units has a different slope based on a location where a pattern area is formed.

5. The vehicle lamp of claim 3, wherein the reflector which forms the second pattern among the reflectors included in each of the lamp units is angled toward the interior of the vehicle as a distance from the vehicle to the location at which the pattern area is formed increases.

6. The vehicle lamp of claim 1, wherein a step difference between the reflective surfaces of the reflector which forms the first pattern among the reflectors is greater than a step difference between the reflective surfaces of the reflector which forms the second pattern among the reflectors.

7. The vehicle lamp of claim 1, wherein the reflective surfaces of a reflector which forms the second pattern among the reflectors reflect light to the same area.

8. The vehicle lamp of claim 1, wherein the reflector which forms the second pattern among the reflectors is disposed above a reflector which forms the first pattern among the reflectors.

9. The vehicle lamp of claim 1, wherein the reflector which forms the second pattern includes an area which forms the first pattern and an area which forms the second pattern.

10. The vehicle lamp of claim 9, wherein the area which forms the second pattern is located in a central portion of the reflector which forms the first pattern.

11. The vehicle lamp of claim 1, wherein the reflectors are integrally formed with each other.

12. A vehicle lamp, comprising:
    a driving direction sensing unit configured to sense a driving direction of a vehicle;
    a driving direction indicating unit which forms a first pattern indicating the driving direction of the vehicle and forms a second pattern indicating the driving direction of the vehicle on a road surface around the vehicle; and
    a control unit configured to adjust the driving direction indicating unit based on the sensed driving direction,
    wherein the driving direction indicating unit includes a first lamp assembly which forms the first pattern and a second lamp assembly which forms the second pattern,
    wherein the second lamp assembly includes a light source and a reflection unit which forms the second pattern by reflecting light emitted from the light source,
    wherein the reflection unit includes a plurality of reflectors having a plurality of reflective surfaces,
    wherein curvatures of the reflective surfaces are different for each reflector.

13. The vehicle lamp of claim 12, wherein the first lamp assembly includes at least one lamp unit arranged in a widthwise direction of the vehicle, and
    wherein the at least one lamp unit includes a reflection unit which forms the first pattern by reflecting light emitted from a light source.

14. The vehicle lamp of claim 12, wherein the reflective surfaces reflect light to the same area.

15. The vehicle lamp of claim 12, wherein the at least one reflector includes a single reflector, and the second pattern includes a single pattern area formed by the single reflector.

16. The vehicle lamp of claim 12, wherein the at least one reflector includes a plurality of reflectors, and the second pattern includes a plurality of pattern areas formed respectively by the reflectors.

17. The vehicle lamp of claim 16, wherein each of the reflectors is angled a greater distance toward the interior of the vehicle as a pattern area formed by the reflector increases in distance from the vehicle.

* * * * *